(12) United States Patent
Robbins et al.

(10) Patent No.: US 11,347,056 B2
(45) Date of Patent: May 31, 2022

(54) FOVEATED COLOR CORRECTION TO IMPROVE COLOR UNIFORMITY OF HEAD-MOUNTED DISPLAYS

(71) Applicant: Microsoft Technology Licensing, LLC, Redmond, WA (US)

(72) Inventors: Steven John Robbins, Redmond, WA (US); Christopher Charles Aholt, Newcastle, WA (US); Andrew Kilgour Juenger, Woodinville, WA (US); Nicholas Mark Cirucci, Enfield, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/108,353

(22) Filed: Aug. 22, 2018

(65) Prior Publication Data

US 2020/0064631 A1    Feb. 27, 2020

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/011* (2013.01); *G02B 2027/0123* (2013.01)

(58) Field of Classification Search
CPC ............ G02B 27/0172; G02B 27/0093; G02B 2027/011; G02B 2027/0123
See application file for complete search history.

(56) References Cited

U.S. PATENT DOCUMENTS 8,020,993 B1 * 9/2011 Fram .................. G06F 3/013
                                                    351/200
8,913,865 B1 * 12/2014 Bennett ................ G02B 6/10
                                                    385/129

(Continued)

FOREIGN PATENT DOCUMENTS

EP      3179447 A1    6/2017
KR      101748563 B1  6/2017
WO      2017053974 A1 3/2017

OTHER PUBLICATIONS

"International Search Report and Written Opinion Issued in PCT Application No. PCT/US2019/038795", dated Nov. 21, 2019, 22 Pages.

*Primary Examiner* — Antonio Xavier
(74) *Attorney, Agent, or Firm* — Mark K. Young; Mayer & Williams, PC

(57) ABSTRACT

A color correction mask programmatically generated in software on an HMD device is applied to a gaze region on a display field of view (FOV) on a head-mounted display (HMD) device to optimize system resources while rendering a display. Eye monitoring sensors are utilized to track movement of a user's eyes while the user operates the HMD device to determine a gaze position of the user's eyes on the display FOV. Using the determined gaze position, a dynamic foveal gaze region is sized around the gaze position so that the foveal portion of the display FOV is color-corrected, that is, color non-uniformities are reduced or eliminated. In other implementations, a gaze-based weighting mode is implemented in which measurements of the user's full eye or eye orbit are utilized to color correct a larger surface area of the display FOV relative to the foveal color correction mode.

20 Claims, 22 Drawing Sheets

(56) References Cited

U.S. PATENT DOCUMENTS

| | | | |
|---|---|---|---|
| 10,088,685 B1* | 10/2018 | Aharoni | G02F 1/133606 |
| 10,578,882 B2* | 3/2020 | El-Ghoroury | G02B 30/27 |
| 2002/0167461 A1* | 11/2002 | Bronson | G02B 27/017 |
| | | | 345/7 |
| 2003/0198393 A1* | 10/2003 | Berstis | G06T 3/0012 |
| | | | 382/239 |
| 2008/0002262 A1* | 1/2008 | Chirieleison | G02B 27/0093 |
| | | | 359/630 |
| 2010/0220291 A1* | 9/2010 | Horning | G02B 27/017 |
| | | | 351/210 |
| 2012/0105310 A1* | 5/2012 | Sverdrup | G02B 27/0172 |
| | | | 345/8 |
| 2013/0016292 A1* | 1/2013 | Miao | G02B 27/283 |
| | | | 349/11 |
| 2013/0057553 A1* | 3/2013 | Chakravarthula | G06F 3/011 |
| | | | 345/468 |
| 2013/0307762 A1* | 11/2013 | Ashbrook | G02B 27/0093 |
| | | | 345/156 |
| 2014/0092006 A1* | 4/2014 | Boelter | G06F 3/013 |
| | | | 345/156 |
| 2014/0247277 A1* | 9/2014 | Guenter | G06T 11/40 |
| | | | 345/611 |
| 2015/0070654 A1* | 3/2015 | Brown, Jr. | G06K 9/0061 |
| | | | 351/210 |
| 2015/0077613 A1* | 3/2015 | Petilli | H04N 5/378 |
| | | | 348/308 |
| 2015/0097925 A1 | 4/2015 | Choo et al. | |
| 2015/0178939 A1* | 6/2015 | Bradski | G06F 3/017 |
| | | | 345/633 |
| 2015/0235447 A1* | 8/2015 | Abovitz | G06F 3/04845 |
| | | | 345/633 |
| 2015/0277123 A1* | 10/2015 | Chaum | G02B 27/0075 |
| | | | 348/62 |
| 2015/0277126 A1* | 10/2015 | Hirano | G02B 27/0101 |
| | | | 359/633 |
| 2016/0081547 A1* | 3/2016 | Gramatikov | G06K 9/00604 |
| | | | 351/210 |
| 2016/0209657 A1* | 7/2016 | Popovich | G02B 6/34 |
| 2016/0210503 A1* | 7/2016 | Yin | G06F 3/00 |
| 2016/0379606 A1* | 12/2016 | Kollin | G02B 27/0093 |
| | | | 345/428 |
| 2017/0091549 A1* | 3/2017 | Gustafsson | G06F 3/04815 |
| 2017/0123489 A1* | 5/2017 | Guenter | A63F 13/5255 |
| 2017/0123492 A1* | 5/2017 | Marggraff | G06F 3/04886 |
| 2017/0176755 A1* | 6/2017 | Cai | G02B 27/4205 |
| 2017/0285343 A1* | 10/2017 | Belenkii | H04N 9/3129 |
| 2017/0287112 A1* | 10/2017 | Stafford | G06F 3/0304 |
| 2017/0287446 A1* | 10/2017 | Young | G09G 5/391 |
| 2017/0316264 A1* | 11/2017 | Gustafsson | G02B 6/0008 |
| 2018/0061116 A1 | 3/2018 | Mitchell et al. | |
| 2018/0084232 A1* | 3/2018 | Belenkii | H04N 13/324 |
| 2018/0090052 A1* | 3/2018 | Marsh | G09G 3/2092 |
| 2018/0103215 A1* | 4/2018 | Snelgrove | H04N 5/341 |
| 2018/0137598 A1* | 5/2018 | Spitzer | G06T 1/20 |
| 2018/0189568 A1* | 7/2018 | Powderly | G06T 19/006 |
| 2018/0203230 A1* | 7/2018 | Vallius | G02B 27/0172 |
| 2018/0262758 A1* | 9/2018 | El-Ghoroury | H04N 19/44 |
| 2018/0357749 A1* | 12/2018 | Young | G06T 3/40 |
| 2019/0079284 A1* | 3/2019 | Le Provost | G02B 27/0093 |
| 2019/0273910 A1* | 9/2019 | Malaika | G06F 3/147 |
| 2020/0051483 A1* | 2/2020 | Buckley | G09G 5/04 |
| 2021/0018751 A1 | 1/2021 | Shmunk | |

* cited by examiner

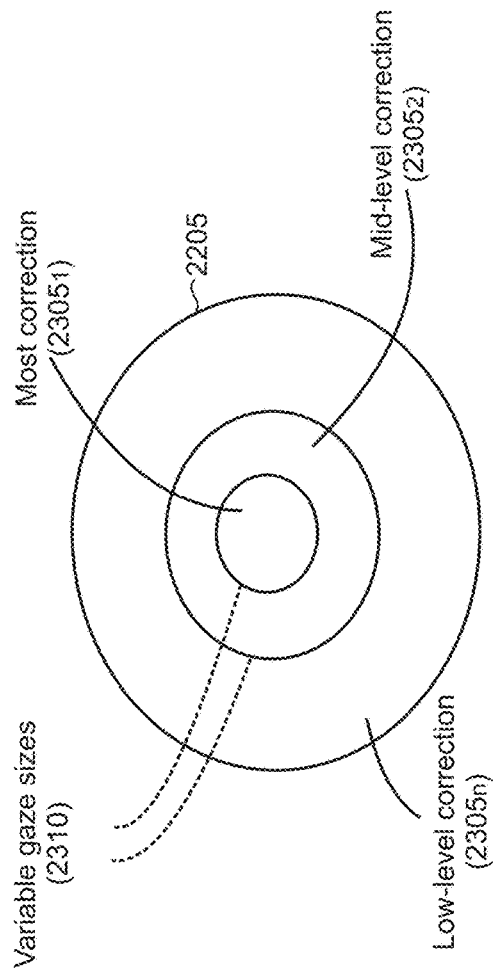
FIG 23
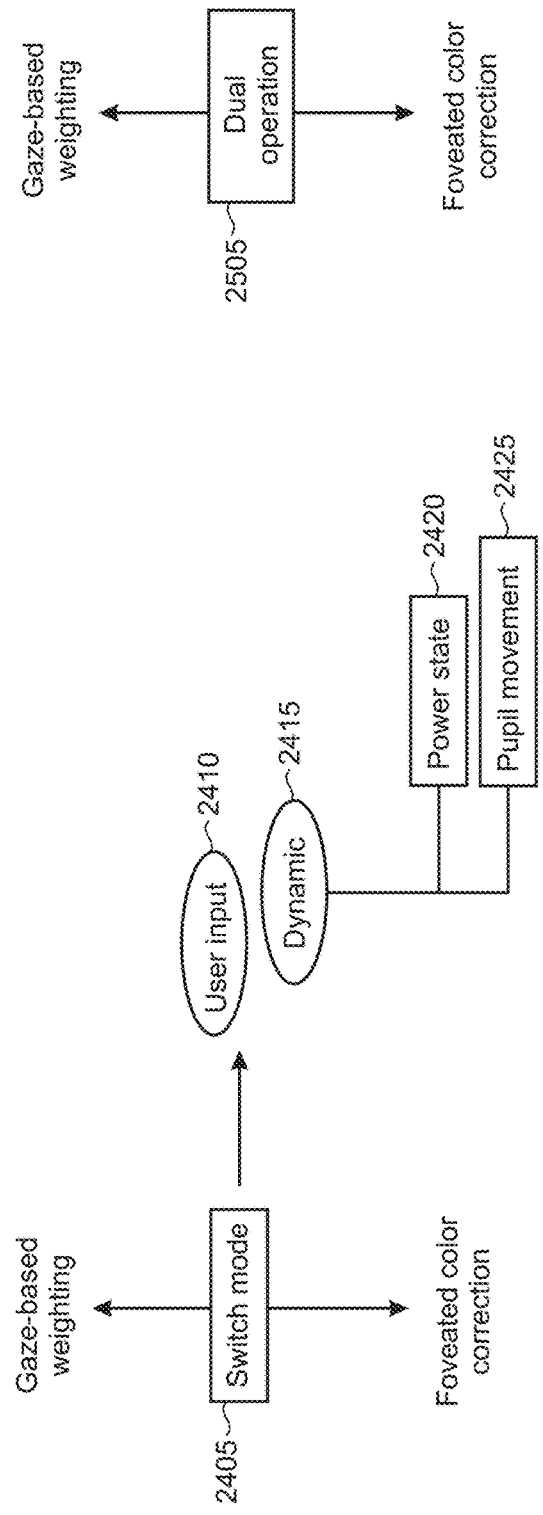
FIG 25
FIG 24

2600

2700

2800

3100

FOVEATED COLOR CORRECTION TO IMPROVE COLOR UNIFORMITY OF HEAD-MOUNTED DISPLAYS

BACKGROUND

Head mounted display (HMD) devices may utilize an optical system to generate virtual images or holograms for observation by a user. Generating full-color holograms through a series of one or more diffractive waveguides introduces color non-uniformities due to inherent limitations resulting from the physics that are applicable to such waveguide-based displays. The color non-uniformities can be corrected at a hardware level through adjustments to the waveguides, or at a software level by implementing algorithms to off set color non-uniformities created by the waveguides (or by other components of the optical system).

Device resources may be unnecessarily and inefficiently utilized when using software to correct color non-uniformities. For example, while a device user may be viewing a portion of a display's field of view (perhaps to observe an object located off to the side), color correction may be unnecessarily applied to the entire field of view (FOV).

SUMMARY

In a computing device having a display such as an HMD device, eye monitoring sensors are configured to enable determination of a user's gaze position to identify a specific region of the display where the user is gazing. A variably-sized gaze region around the identified gaze position is selected to which the device generates and applies a color correction mask to create a foveal color-corrected gaze region. The color correction mask can therefore be optimized to the specific gaze region, and other parts of the display outside the gaze region may be less color-corrected as they are in the user's peripheral vision. As the user looks around the display, the color correction mask is dynamically generated and applied in real time to the gaze region around the identified gaze position.

The size of the foveal color-corrected gaze region can be dynamically and variably selected based on various characteristics associated with the device and the user. For example, device characteristics can include displayed content, exit pupil size, processing latency, and device performance and capabilities. User characteristics may include, for example, pupil size, eye slew rate, and head movement.

In other implementations, a gaze-based weighting color correction mask may be applied to the display which is based on measurements of the user's full eye or an orbit of the eye as opposed to the pupil as in foveal color correction discussed above. Using these measurements, the color correction mask may be applied to a larger surface area of the display relative to the foveal color-corrected gaze region. Gaze-based weighting may operate separately from the foveal color correction mode or both modes may operate simultaneously. Switching between a gaze-based weighting mode and foveal color correction mode may occur responsive to user input or dynamically. Dynamic switching may occur when, for example, the device's power state reaches a low threshold level or the user's eye slew rate reaches a threshold rate. In both instances, switching to gaze-based weighting may be preferable since it utilizes lower battery power and does not use real-time pupil tracking in correcting the display.

The implementation of a foveal color-corrected gaze region and gaze-based weighting color correction enables optimization of device operations and user experiences. For example, for foveal color correction the user will not know that real-time color correction is being implemented since a uniformly color-corrected region of the display FOV is observed wherever the user gazes on the display. Depending on the size of the foveal color-corrected gaze region, the user will perceive what seems to be a perfectly color-uniform display, however only the selected region around the gaze position of the display FOV is actually well-corrected. The present foveated color correction of the display may improve device performance compared to manipulation of other optical parameters. For example, a conventional static color correction scheme, such as implementing an overall brighter display, can enhance perceived color fidelity at the expense of increased power consumption and load on device resources. For battery-powered devices, such tradeoffs may be undesirable. By enabling non-uniform color correction across the device display, the present foveated color correction preserves system resources while enhancing the user's perception of high-fidelity color rendering.

The implementation of gaze-based weighting color correction complements the features of the foveal color correction. While gaze-based weighting provides an optimized display FOV like foveal color correction, it does so at a lower battery consumption rate. Furthermore, when eye slew rate of the user exceeds a threshold rate during foveal color correction, the user can select or the device can dynamically switch to the gaze-based weighting so that a larger surface area of the display is color-corrected without using the pupil's location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 23 shows variable sized internal regions to the correction region for gaze-based weighting;

FIG. 24 shows illustrative switching between a gaze-based weighting mode and a foveated color correction mode;

FIG. 25 shows illustrative dual operation of the gaze-based weighting mode and the foveated color correction mode;

Like reference numerals indicate like elements in the drawings. Elements are not drawn to scale unless otherwise indicated.

DETAILED DESCRIPTION

Figure 1:
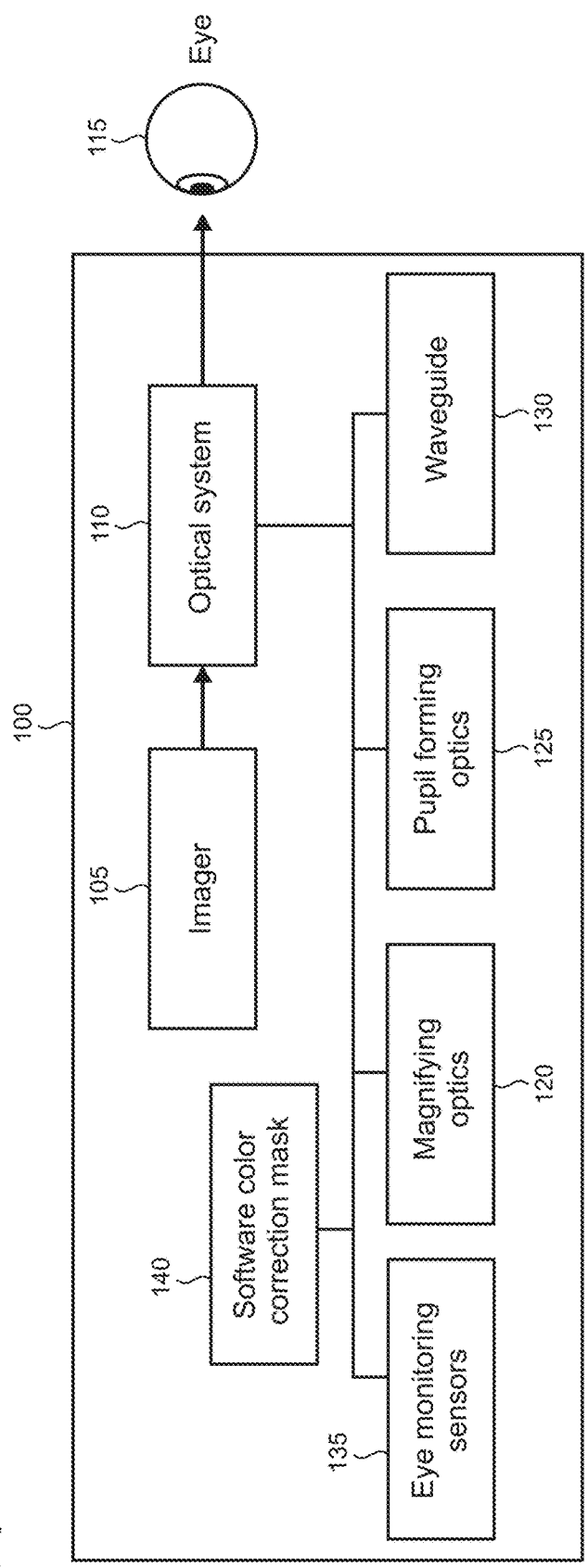
FIG. 1 shows a block diagram of an illustrative head-mounted display (HMD) device system.

FIG. 1 shows a block diagram of an illustrative near-eye display system 100 which may incorporate a combination of diffractive optical elements (DOEs) that provide in-coupling of incident light into a waveguide, exit pupil expansion in two directions, and out-coupling of light out of the waveguide. Near-eye display systems are often used, for example, in head-mounted display (HMD) devices in industrial, commercial, and consumer applications. Other devices and systems may also use near-eye systems, as described below. The near-eye display system 100 is an example that is used to provide context and illustrate various features and aspects of the present foveated color correction to improve color uniformity of head-mounted displays.

System 100 may include one or more imagers (representatively indicated by reference numeral 105) that work with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130. The imager 105 may include or incorporate an illumination unit and/or light engine (not shown) that may be configured to provide illumination in a range of wavelengths and intensities in some implementations.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the pupil forming optics 125 to form a pupil and the eye 115 acts as the last element in the optical chain and converts the light from the pupil into an image on the eye's retina as a virtual display.

Figure 2:
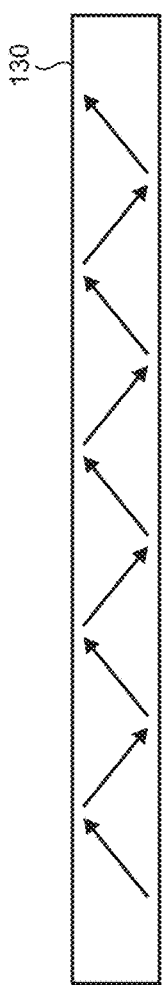
FIG. 2 shows propagation of light in a waveguide by total internal reflection.

The waveguide 130 facilitates light transmission between the imager and the eye. One or more waveguides can be utilized in the near-eye display system because they are transparent and because they are generally small and lightweight (which is desirable in applications such as HMD devices where size and weight are generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

The software color correction mask 140 utilizes algorithms to correct issues with color non-uniformity on the display which may result, for example, from images traveling along the waveguides. The color correction mask software may use various techniques known in the art to apply colors, within the masked area, which blend with displayed colors, preserving the intended color and thereby neutralizing color non-uniformities.

Figure 29:
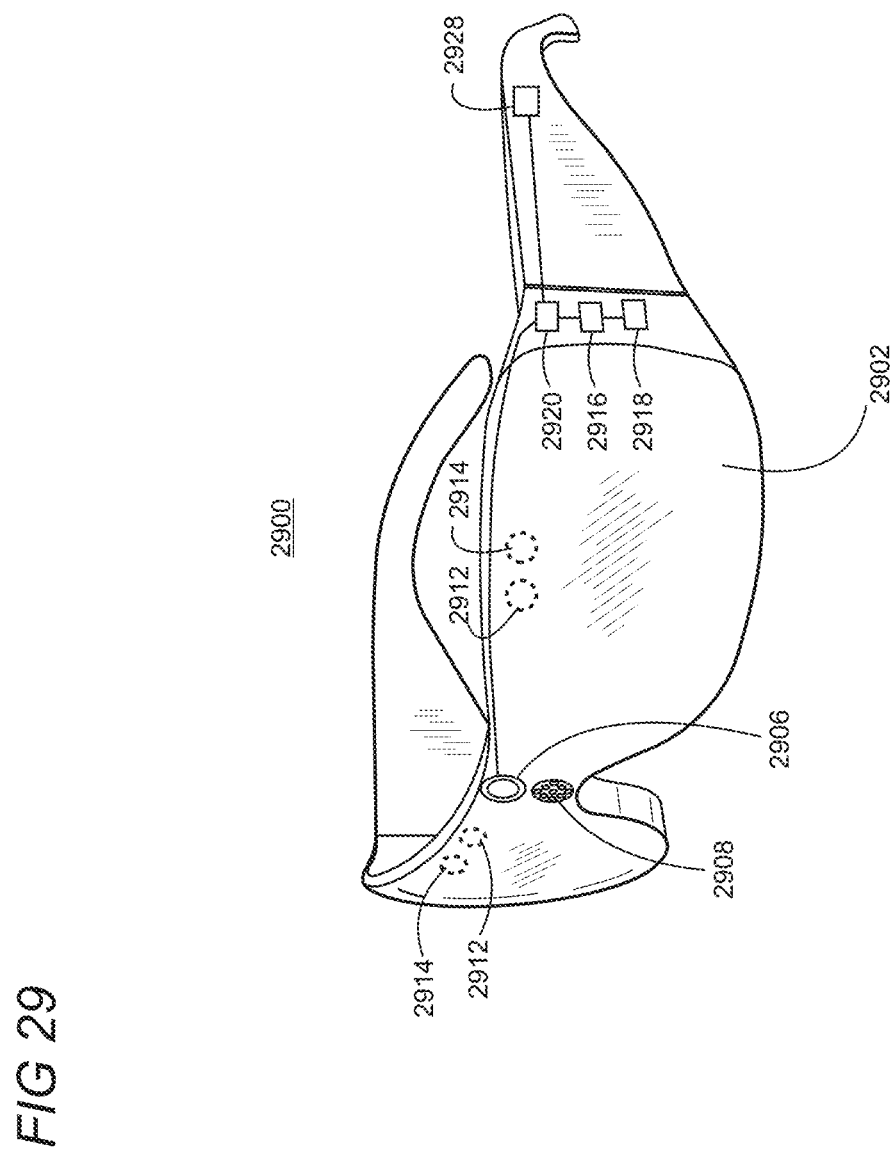
FIG. 29 is a pictorial view of an illustrative example of a virtual reality or mixed reality HMD device.
Figure 30:
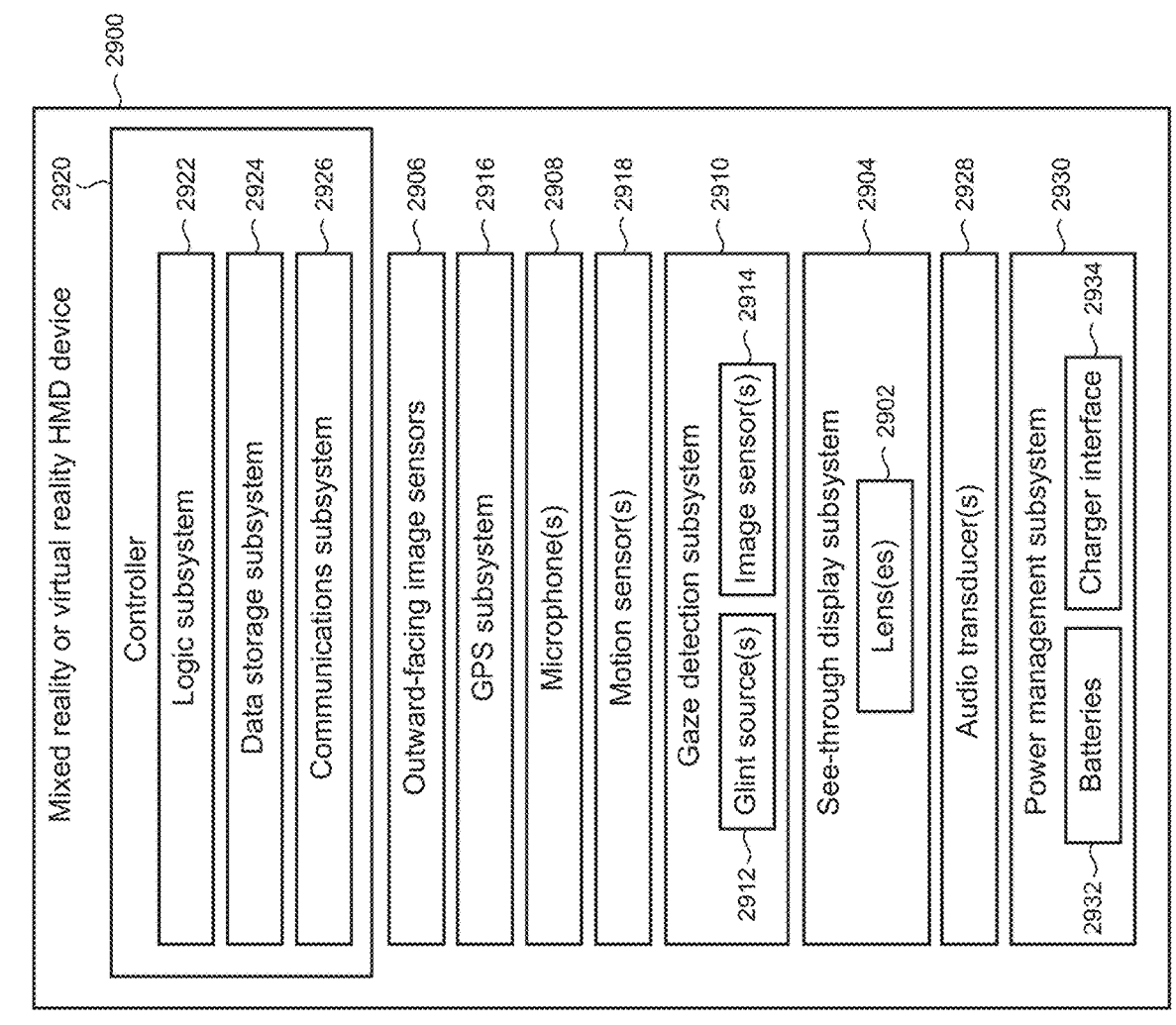
FIG. 30 shows a block diagram of an illustrative example of a virtual reality or mixed reality HMD device.

Eye monitoring sensors 135 can include hardware configured to monitor the user's eyes by detecting a location of the user's pupils and identifying a corresponding position on the display of the HMD device. A light sensor such as an infrared light may be radiated at the user's eyes and picked up by a camera or other optical sensor to determine the pupil's relative location within the eye. An optical sensor such as a video camera may pick up the user's pupil to determine its relative location. The pupil's location may be identified according to various axes in which xyz coordinates or xy coordinates of the user's pupil can be identified. The discussion with respect to FIGS. 29-30 provide additional exemplary discussion of identifying the gaze position of the user's eyes while operating the HMD device.

Figure 4:
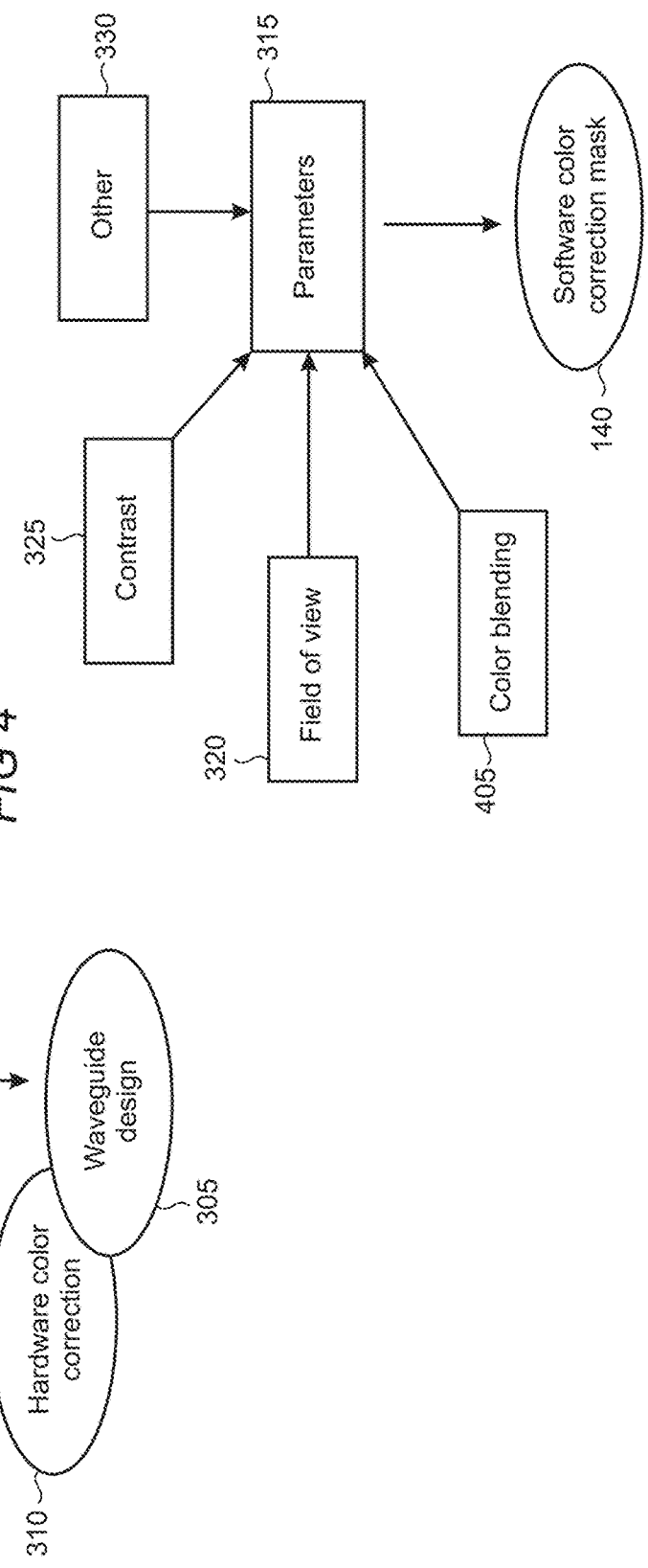
FIG. 4 shows a diagram of illustrative parameters for software when implementing a color correction mask on the display.
Figure 3:
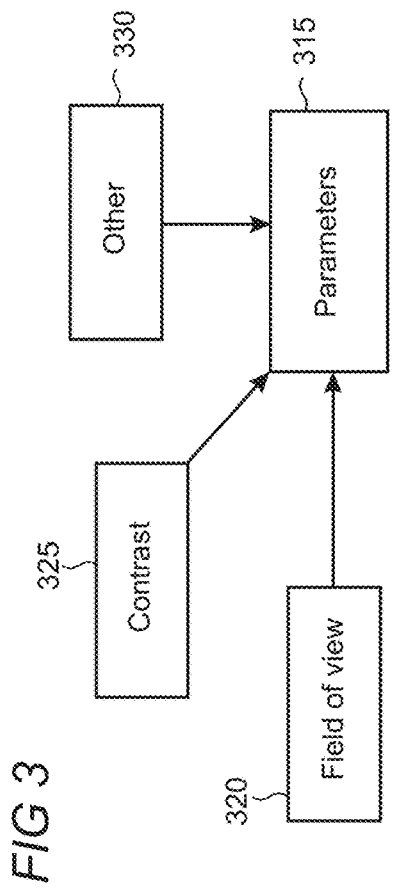
FIG. 3 shows a diagram of illustrative parameters for a waveguide design to correct color non-uniformities on a display.

FIGS. 3 and 4 show illustrative diagrams of factors which affect parameters in manufacturing color correction hardware and software, respectively. Waveguide design 305 is one method to implement color correction at the hardware level (as representatively illustrated by numeral 310). The design of a waveguide may be customized to correct color non-uniformities as the imaging light travels to the display of the HMD device. A color correction mask programmatically implemented in software may alternatively be configured at the HMD device and executable by one or more processors, such as at a graphics processing unit (GPU) or the central processing unit (CPU). Parameters 315 considered when designing the software and hardware include the field of view 320, contrast 325 at the display, and others 330. The software further considers the effects of color blending 405 in the application of the mask on the colors on the display.

Figure 5B:
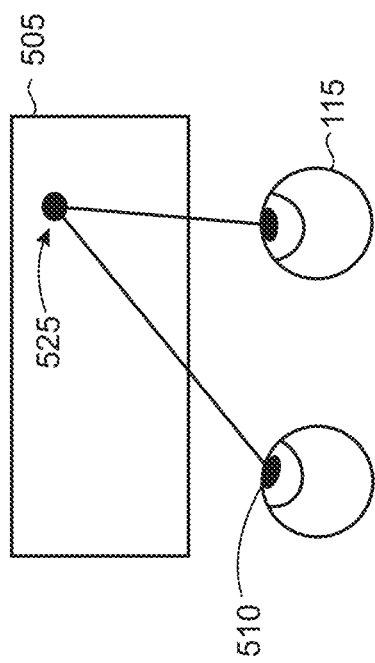
FIGS. 5A-B show illustrative user gaze positions on a display of the HMD device.
Figure 5A:
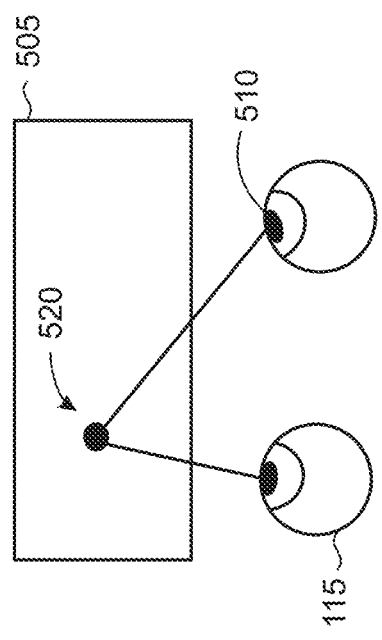

FIGS. 5A and 5B show illustrative eyes 115 and a display field of view (FOV) 505 associated with an HMD device. In each example, the user's pupils 510 are staring at a particular point on the display FOV, which is illustratively indicated as the user's gaze positions 520 and 525.

Figure 6:
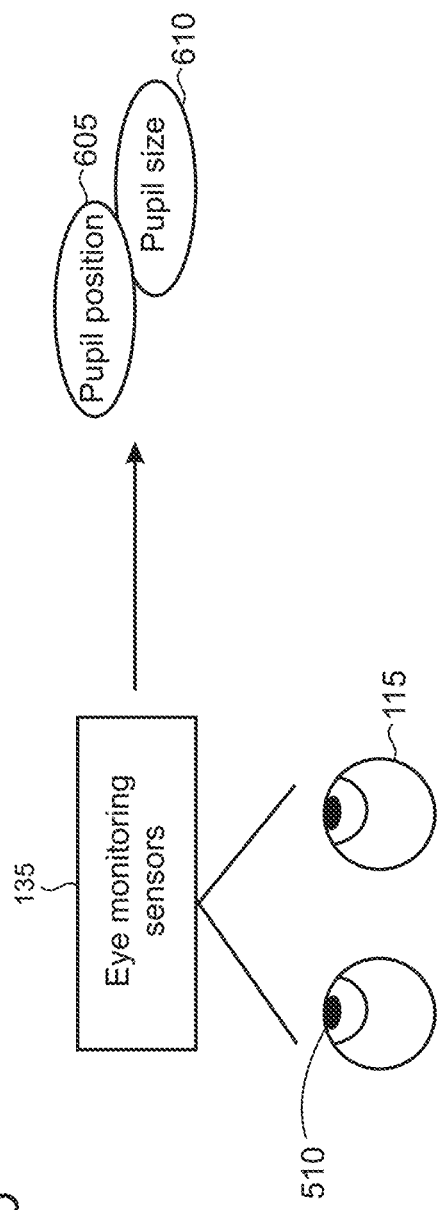
FIG. 6 shows illustrative one or more sensors monitoring a user's eyes.
Figure 8:
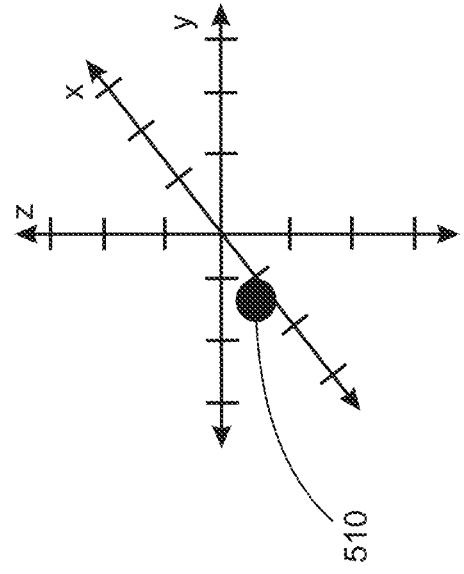
FIGS. 7-8 show illustrative graphs with xyz coordinates of a user's pupils determined using the eye monitoring sensor.
Figure 7:
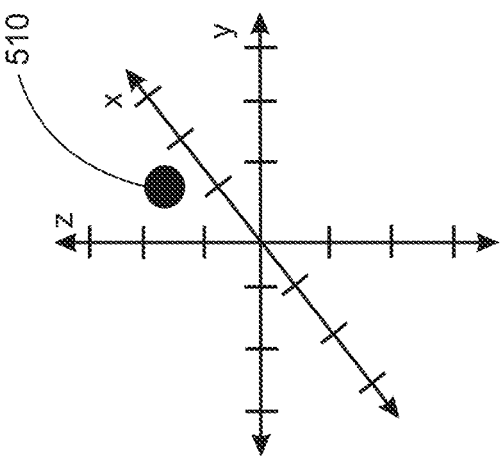

The eye monitoring sensors 135 are utilized to track and detect characteristics of the user's eyes as illustratively shown in FIG. 6. For example, the eye monitoring sensors may track the pupil position 605 in order to determine the gaze position on the display FOV (FIGS. 5A-B). FIGS. 7 and 8 illustratively show the eye coordinates of the user's pupils 510 along xyz axes. The coordinates can be translated to a specific gaze position on the display as illustratively shown in FIGS. 5A-B. The eye monitoring sensors may also track a pupil size 610 of the user's eyes. The pupil size may be measured when the HMD device is initialized and also periodically checked to gauge dilations and contractions of the pupil.

Figure 9:
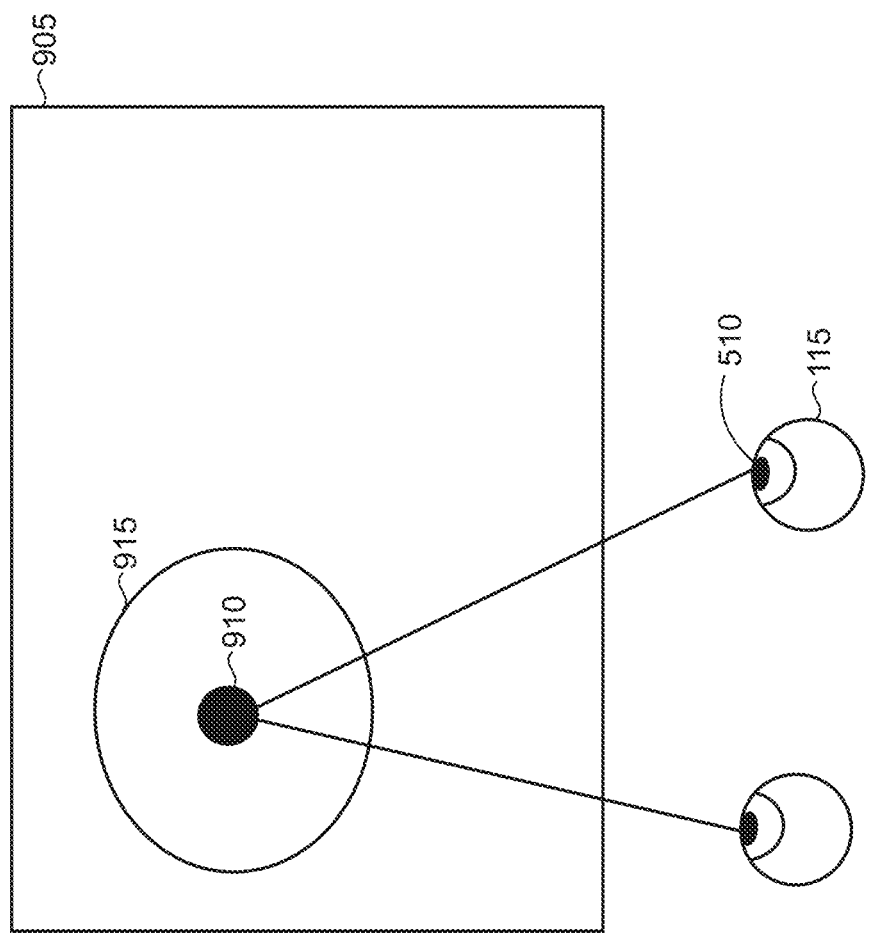
FIG. 9 shows an illustrative display field of view, gaze position, and foveal color-corrected gaze region.

FIG. 9 shows an illustrative display FOV 905 in which the detected gaze position 910 is utilized to determine a foveal color-corrected gaze region 915 on the display FOV. The foveal color-corrected gaze region is the portion on the display FOV which is visibly optimized with a color correction mask. Applying the mask only to the gaze region can preserve system resources such as processing power and battery consumption. For example, the mask can be generated and applied to foveated portions of the screen while the HMD device is in use, as opposed to applying the mask to the entire display FOV which inherently includes a user's less optimum peripheral vision.

Figure 10:
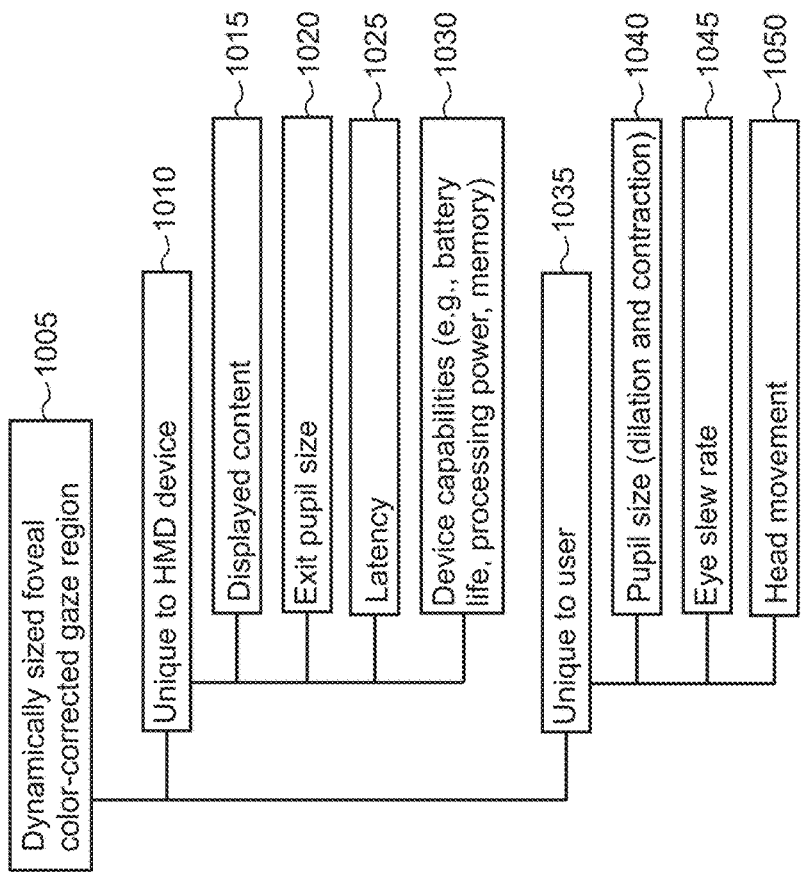
FIG. 10 shows a taxonomy of factors which affect the dynamically sized foveal color-corrected gaze region.

The foveal color-corrected gaze region may be dynamically sized based on various characteristics which are unique to the HMD device and unique to the user. FIG. 10 shows an illustrative taxonomy of factors which affect the dynamically sized foveal color-corrected gaze region 1005. Factors unique to the HMD device 1010 include displayed content 1015, exit pupil size 1020, latency 1025, and device capabilities (e.g., battery life, processing power, and available memory) 1030. Factors unique to the user 1035 include pupil size (dilation and contraction) 1040, eye slew rate 1045, and head movement 1050.

Using the factors, the HMD device takes a multi-variate approach in determining an appropriate size of the foveal color-corrected gaze region. The various factors may be measured periodically or continuously while the device is in use using various sensors or information available to the HMD device, including the eye monitoring sensors discussed above. The HMD device may have access to and utilize various information local to the device which relate to the characteristics shown in FIG. 10. Such accessible information can include, for example, exit pupil size, remaining battery life, performance ability of the processor (e.g., speed in GhZ), extensiveness or lack of use of the processor, and latency. The HMD device may employ content recognition software to measure the complexity or resource-intensiveness of the displayed content.

The information may be gathered periodically to provide real-time determinations and adjustments to the size of the foveal color-corrected gaze region. The information gathered or sensed may be performed upon initial use of the HMD device, in which, based on that information, a foveal color-corrected gaze region size may be determined and set. The size of the foveal color-corrected gaze region may be subsequently adjusted during use or may remain the same after initialization.

Figure 11:
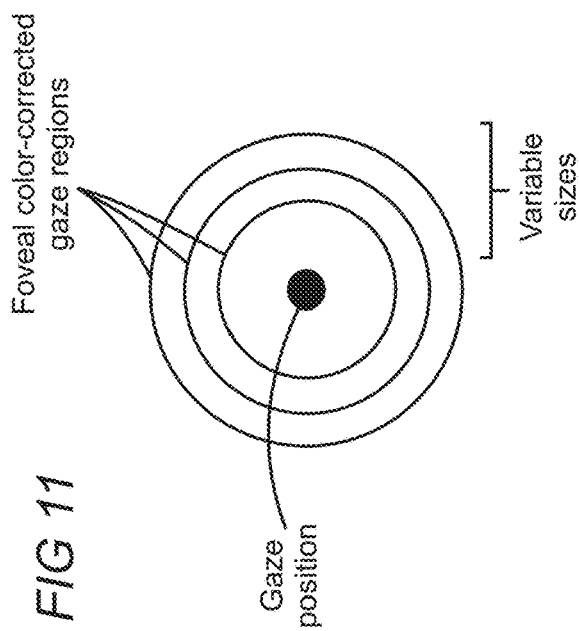
FIG. 11 shows the dynamicity of the foveal gaze color-corrected region based on the taxonomy of factors depicted in FIG. 10.

FIG. 11 shows an illustrative diagram of the dynamicity of foveal color-corrected gaze region sizes using one or more of the factors depicted in FIG. 10. Each circle around the gaze position illustrates an exemplary size of a foveal color-corrected gaze region which defines the metes and bounds of the color correction mask that is programmatically implemented. Thus, the eye monitoring sensors and software-implemented color correction mask interoperate with each other to deliver a tailored color correction mask to the user which optimizes system resources and user experiences. That is, the HMD device can operate with low latency or lag while still providing the user with an optimized visual experience of the display FOV. The user may not know of the real-time application of the color correction mask since the mask tracks the gaze position of the user on the display. Furthermore, the user may not know that the color correction mask is only applied to a portion of the display FOV since the color-corrected region follows wherever the user looks. Thus, system resources are saved without interference to the user's experience.

Figure 12:
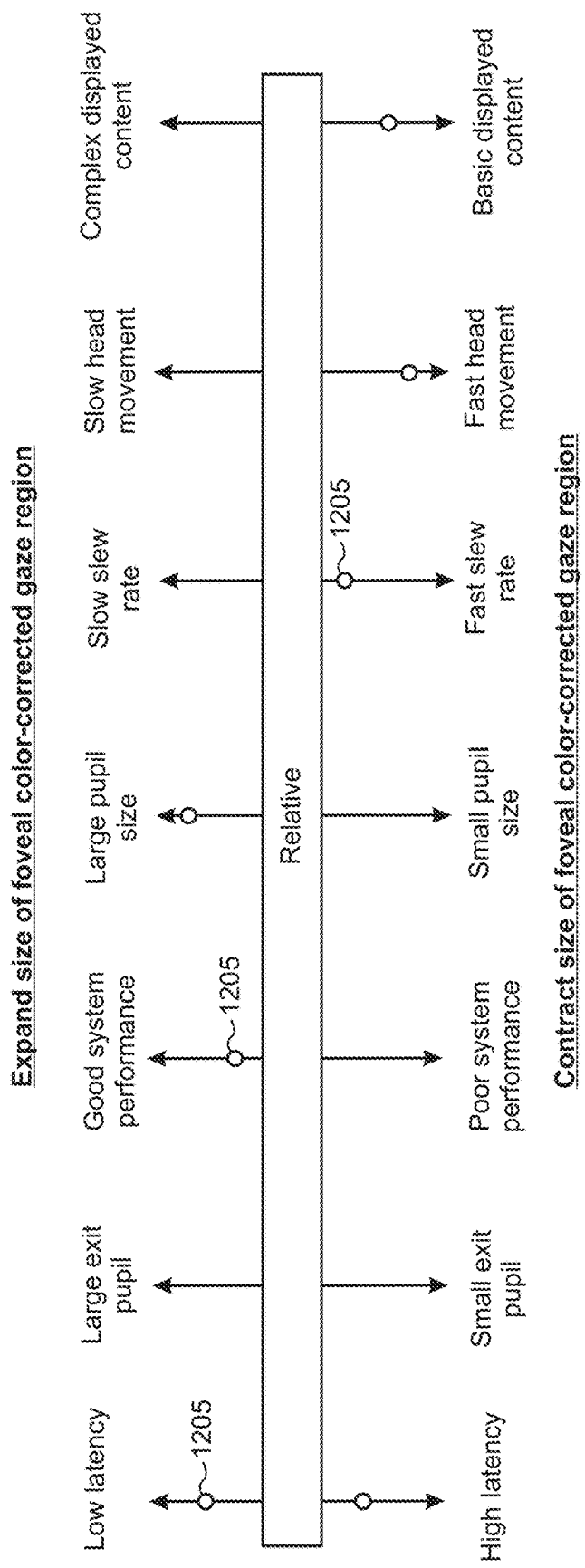
FIG. 12 shows the illustrative effects on the size of the foveal gaze region using the exemplary factors shown in FIG. 10.

FIG. 12 shows the effect of the factors shown in FIG. 10 on the dynamically sized foveal color-corrected gaze region, in which the region can expand or contract based on the relative degree of measurement that is detected for respective factors. While all factors are depicted in FIG. 12, in operation, the HMD device may consider one, two, or any number of factors when determining or adjusting the size of the foveal color-corrected gaze region.

Threshold values 1205 may be assigned to one or more of the factors which trigger the HMD device to adjust the size of the foveal color-corrected gaze region upon satisfaction. For example, eye slew rate, latency, and system performance, among others, may be assigned one or more thresholds which trigger a size adjustment. If latency exceeds a threshold time, then the size of the foveal color-corrected gaze region may contract to reduce the amount of latency. In contrast, if latency is minimal then the HMD device can expand the foveal color-corrected gaze region to provide a greater range of color uniformity to the user. Thus, along the two-way lines in FIG. 12 there may be one or more threshold values to trigger size adjustments. In another embodiment, the foveal color-corrected gaze region may operate along a sliding scale for each factor.

Certain factors may be given greater weight in determining the size of the foveal color-corrected gaze region than others. For example, while system performance may be optimal, if the displayed content is basic such as an article or a book the user is reading, then the foveal color-corrected gaze region may be contracted despite the device's capabilities for expansion. This intelligent consideration can save battery life instead of unnecessarily expanding the region, for example, by applying the mask to the last line on the page when the user is currently reading the first line.

To continue with the example in which the user reads an article or a book, the user's eye slew rate may be relatively high since the user continuously maneuvers his eyes from left to right on the display. The displayed content is simple and makes the user's eye movements predictable and narrow to only one line of reading at a time. The gaze region may span several lines on the page to manage the user's high slew rate. Spanning the foveal color-corrected gaze region any more than a few lines may unnecessarily waste device resources, such as battery power, since the user will predictably only read so many words on the page at a time. Device resources can further be preserved by removing the color correction mask from previously viewed portions. Thus, the predictability of applying the foveal color-corrected gaze region to an e-book provides forward-looking display adjustments to provide greater user experiences while saving system resources.

Figure 13:
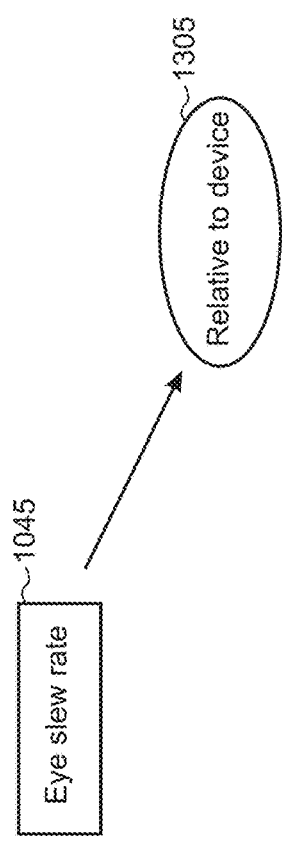
FIG. 13 shows an illustrative diagram indicating that eye slew rate is relative to the device.
Figure 14:
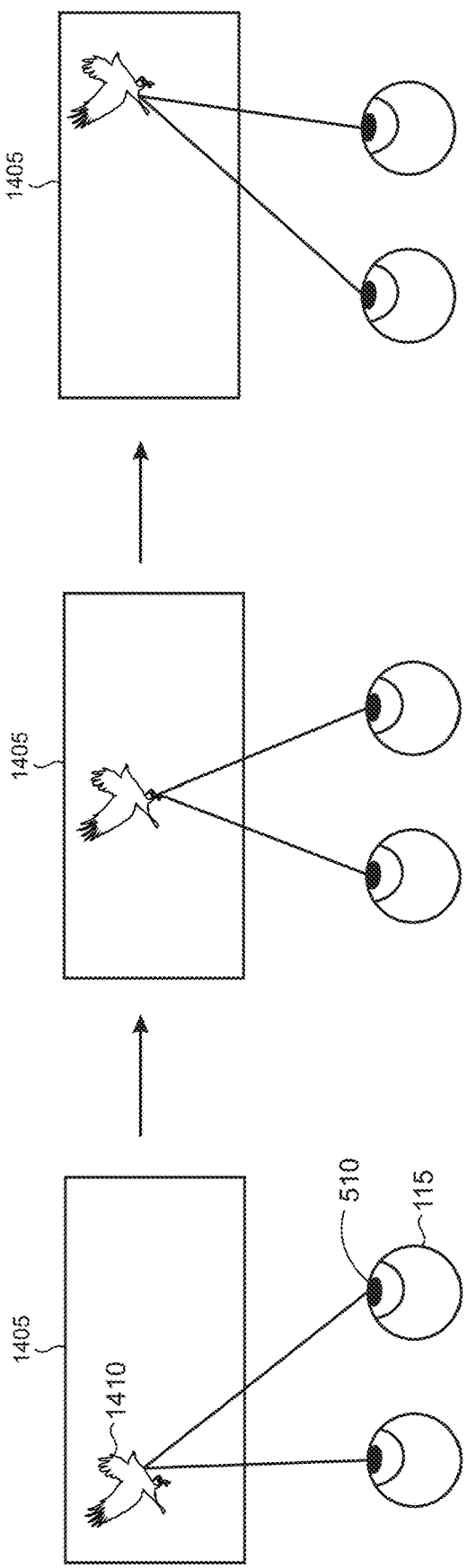
FIG. 14 shows consecutive fields of view (FOVs) of the user tracking a moving object on the display.

FIG. 13 shows an illustrative diagram in which the user's eye slew rate 1045 may be relative to the device 1305. In some scenarios the user's eyes may be moving rapidly, but if the user's eyes are tracking an object moving across the display, then the user's eye slew rate may be assigned a relatively slower value. FIG. 14 sequentially shows the user's pupils 510 tracking a bird 1410 flying across the display FOV 1405. While the user's pupils may be moving, the image displayed and observed by the user is similar in each sequential scene and therefore the slew rate may not be as quick as in other scenarios.

Figure 15:
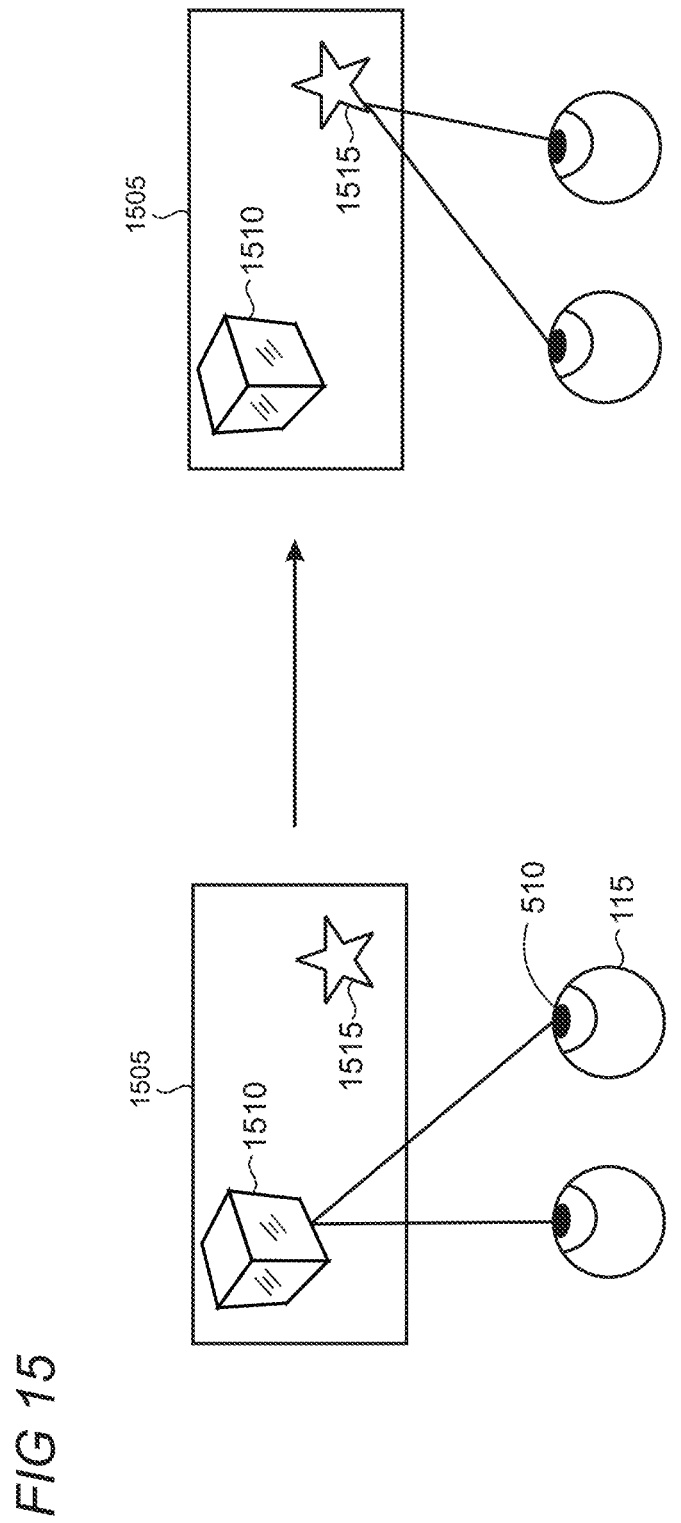
FIG. 15 shows consecutive FOVs of the user viewing static objects on the display.

FIG. 15 shows an example in which the user's eye slew rate may be relatively quicker than in the example depicted in FIG. 14. The user's pupils move across the display FOV 1505 from a box 1510 to a star 1515. The display did not change across sequences and the user did not track any object. The user's pupils changed direction while the screen remained static. Thus, the user's eye slew rate relative to the device is fast.

Figure 16:
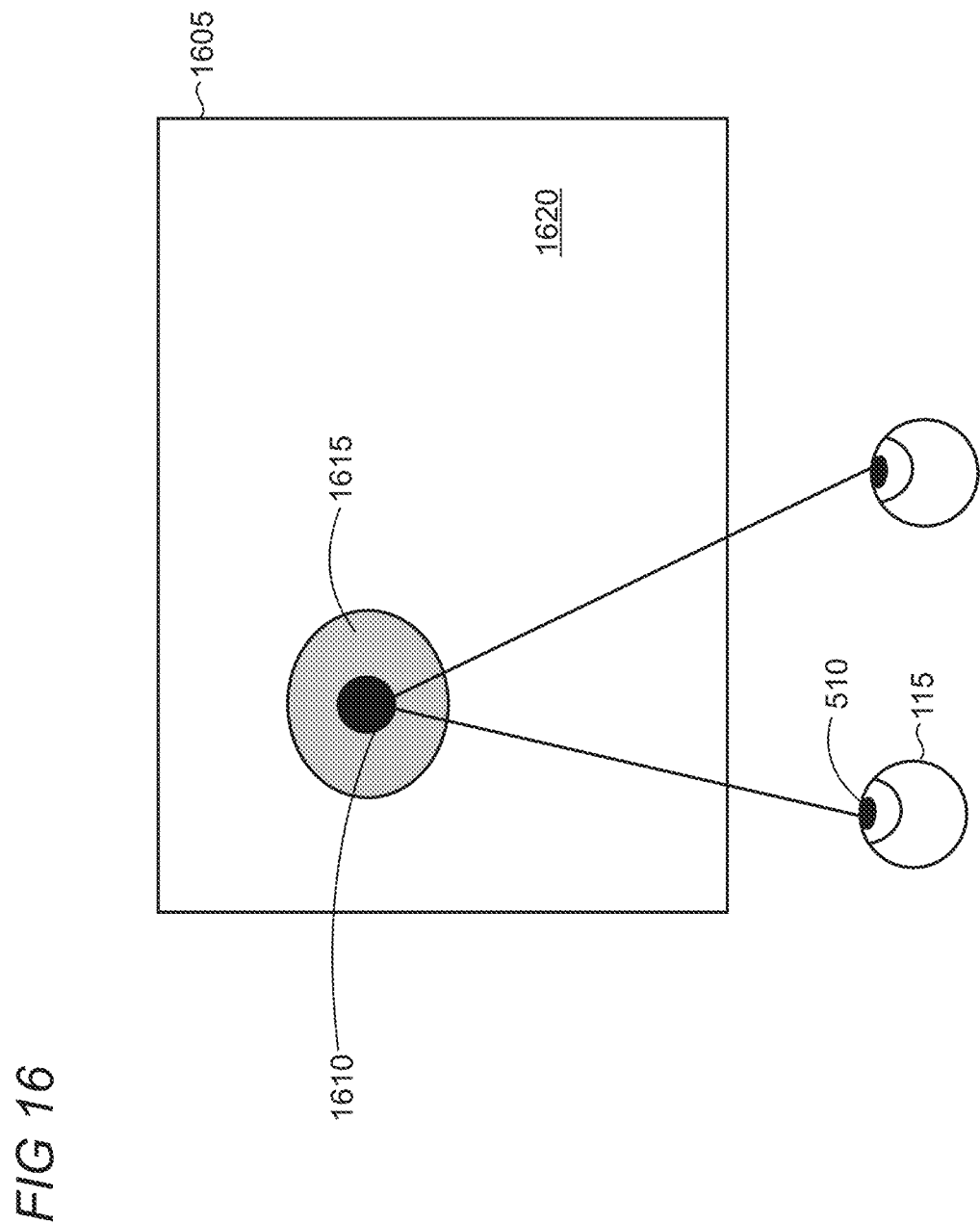
FIGS. 16-18 show illustrative varying sized foveal color-corrected gaze regions on the display FOV.
Figure 17:
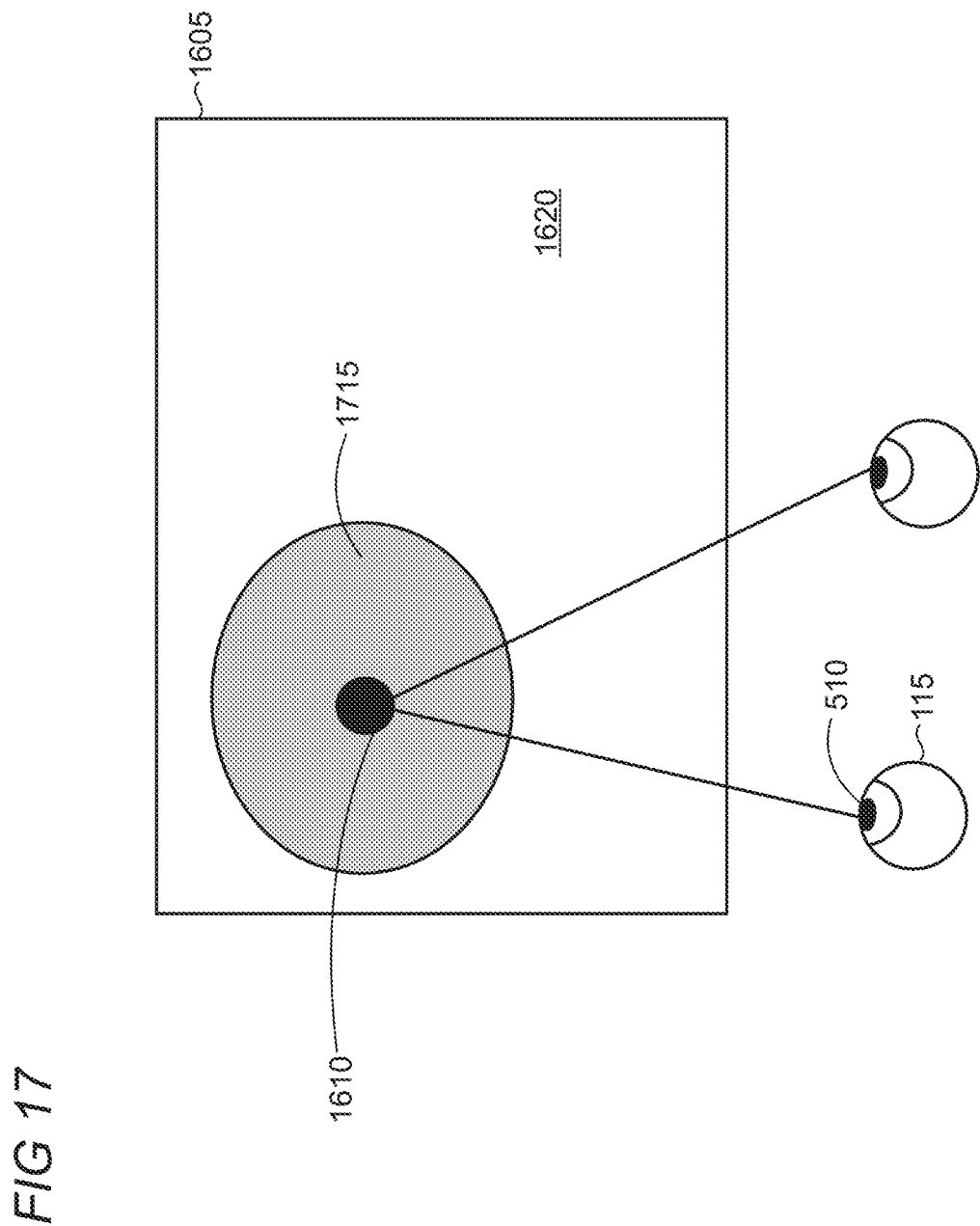
Figure 18:
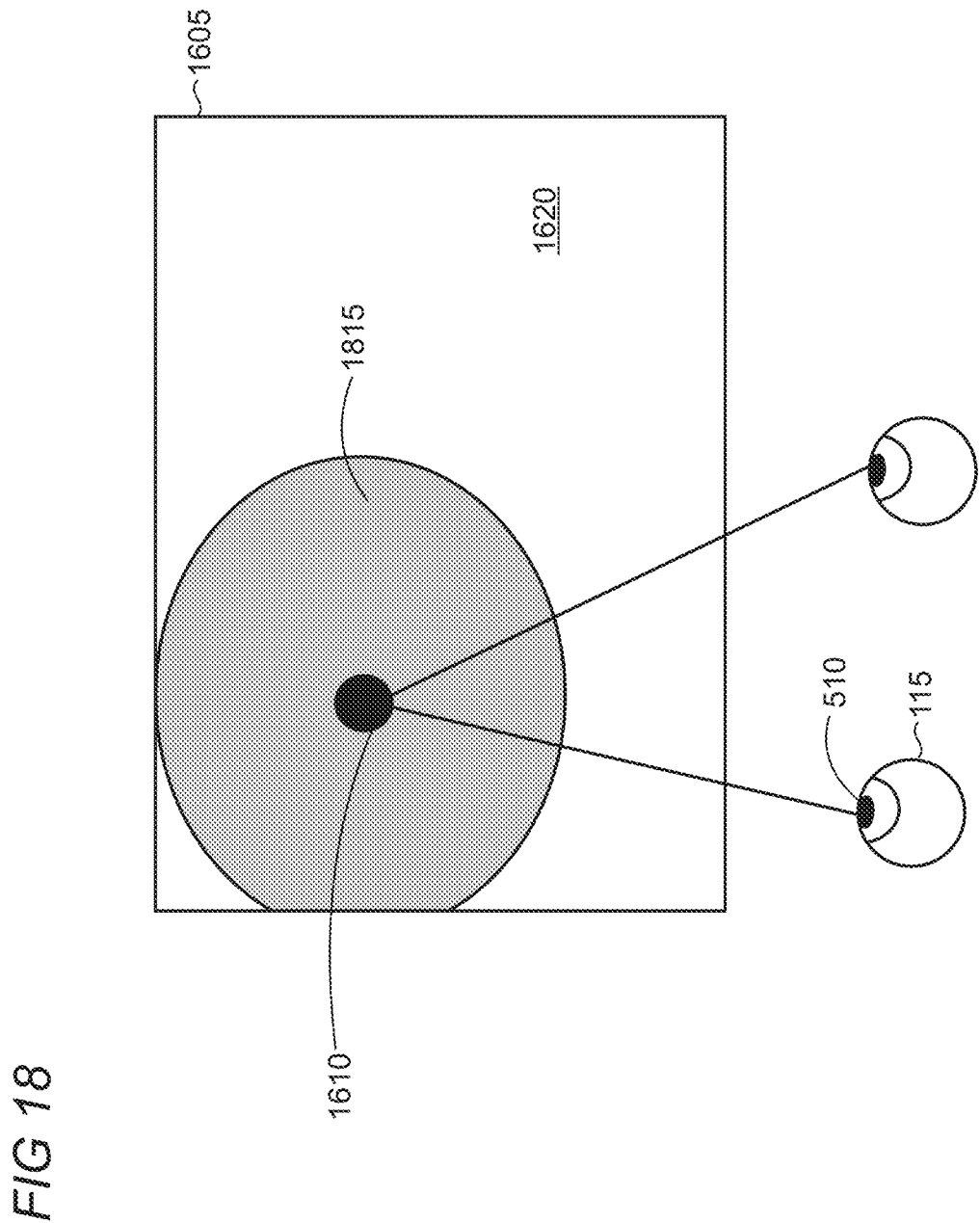

FIGS. 16-18 show illustrative sizes of a foveal color-corrected gaze region on a display FOV 1605 surrounding a gaze position 1610 based on the factors depicted in FIG. 10. As shown in FIGS. 16-18, the respective foveal color-corrected gaze regions 1615, 1715, and 1815 expand in size depending on the assessment of the specific factors to provide an optimized user experience while operating the HMD device. The gray area within the foveal color-corrected gaze region graphically represents the color correction mask applied to the region. The remaining area 1620 within the display FOV 1605 may be within the user's periphery view and not receive the color correction mask and the color uniformities may be less optimal relative to the foveal color-corrected gaze region. The remaining area 1620 may be uncorrected by the software or corrected to a lesser extent than the gaze region.

Figure 19:
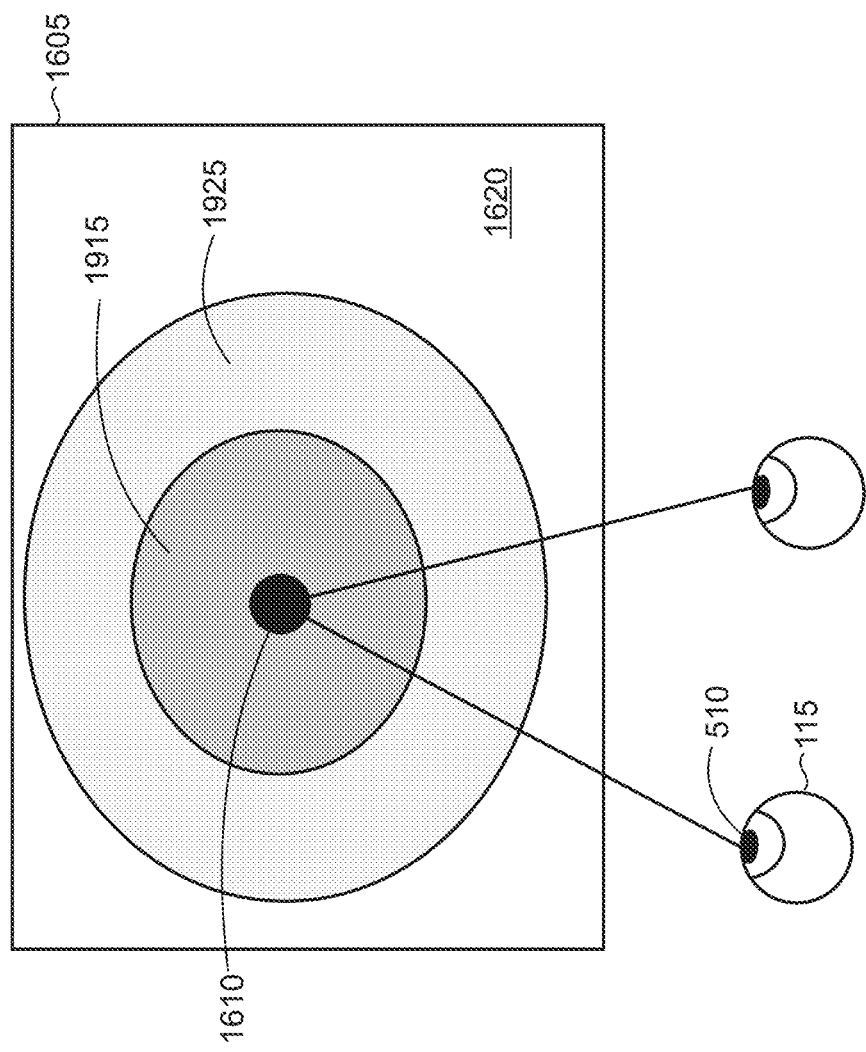
FIG. 19 shows an illustrative display FOV with a color-corrected peripheral region.

FIG. 19 shows an illustrative display FOV 1605 in which the HMD device employs the color correction mask within the foveal color-corrected gaze region 1915 and a less optimal mask within a peripheral region 1925 which may be in the user's peripheral view. The peripheral region may be color-corrected to a lesser extent relative to the gaze region to bridge the gap between the foveal color-corrected gaze region and the uncorrected area represented by numeral 1620.

Figure 20:
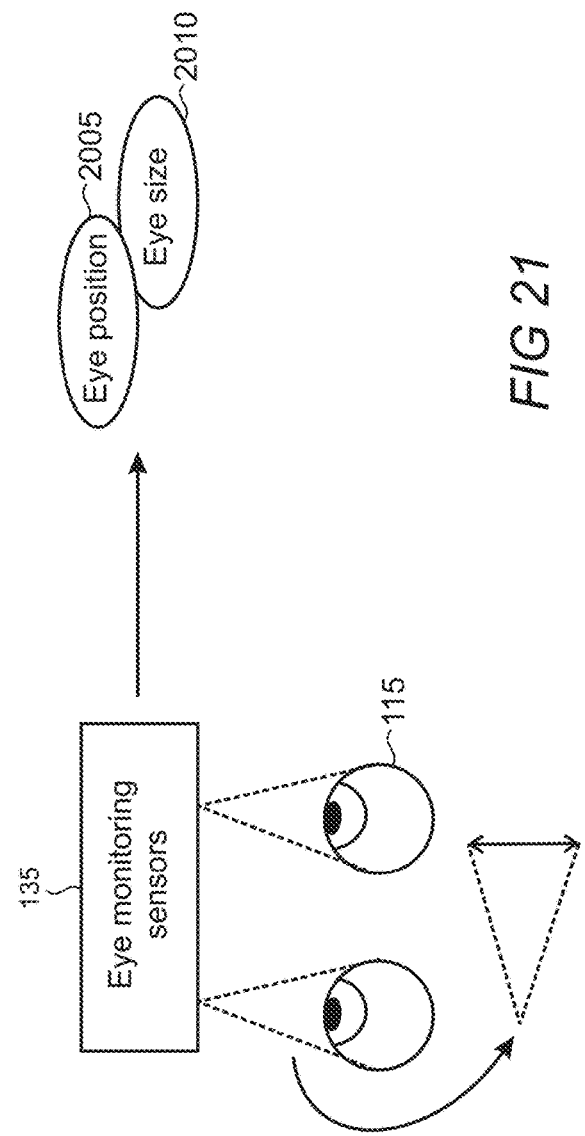
FIG. 20 shows illustrative eye monitoring sensors for gaze-based weighting.

FIG. 20 is an illustrative diagram in which eye monitoring sensors measure characteristics of a user's eye to provide color correction on a display using gaze-based weighting features as opposed to the foveal color correction features discussed above. The eye monitoring sensors 135 measure a position and a size of the full or entire eye 115 or an orbit of the eye and use the respective measured size as a basis for color correcting a display FOV, as representatively shown by numerals 2005 and 2010. Measuring the full or entire eye includes measuring that which is exposed to and observable by the eye monitoring sensors, that is, the surface area of the eye which is facing outward from the user's head. As shown in FIG. 20, the measurement of the eye may be measured according to a diameter or radius of the user's eye or eye's orbit, or other distance measurement.

Figure 21:
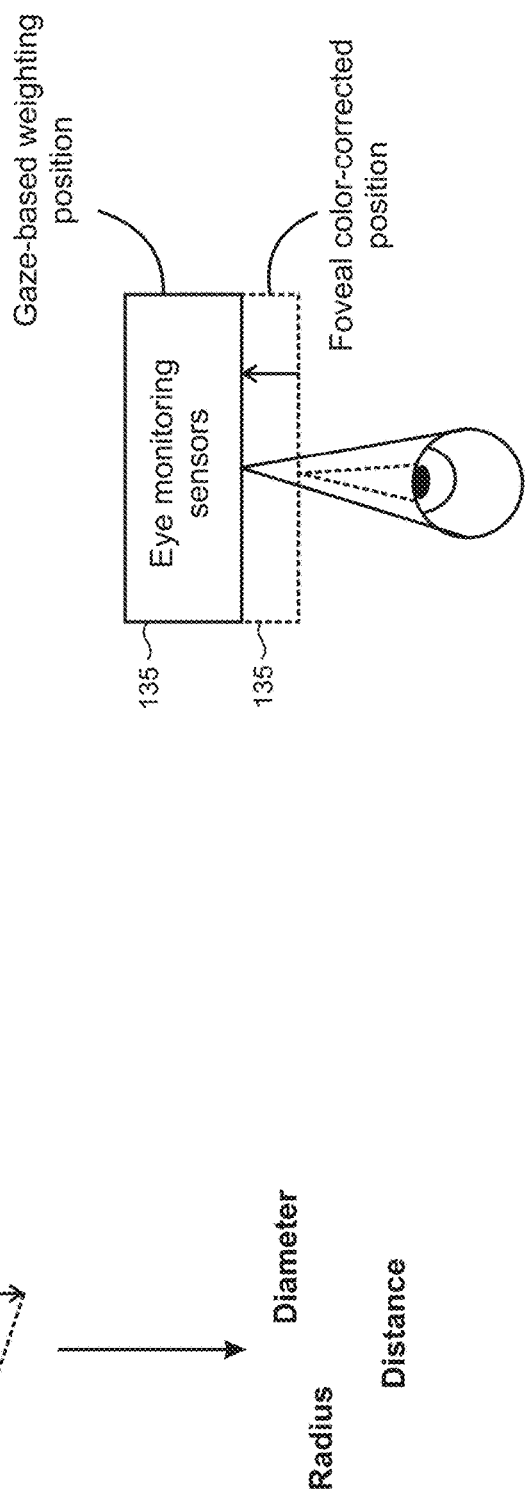
FIG. 21 shows illustrative adjustable positions for the eye monitoring sensors when measuring for foveal color-correction versus gaze-based weighting.

FIG. 21 shows an illustrative diagram in which the eye monitoring sensors 135 are re-positioned depending on the color correction mode utilized, that is, gaze-based weighting or foveal color correction. In order for the eye monitoring sensors to measure the larger surface area of the full eye or the eye's orbit, the eye monitoring sensors are re-positioned outward from the eye relative to the sensor's position when measuring the user's pupil for foveal color correction. The eye monitoring sensors may be adjusted by re-positioning a lens of the sensor or by sliding on movable tracks which are powered to move in two directions forward and back.

In FIG. 21, the solid lines representatively show the measurement of the user's eye for gaze-based weighting and the broken lines representatively show the measurement of the user's pupil for foveal color correction. The change in position of the sensors enables the sensors to capture the greater or smaller surface area for the respective modes.

Figure 22:
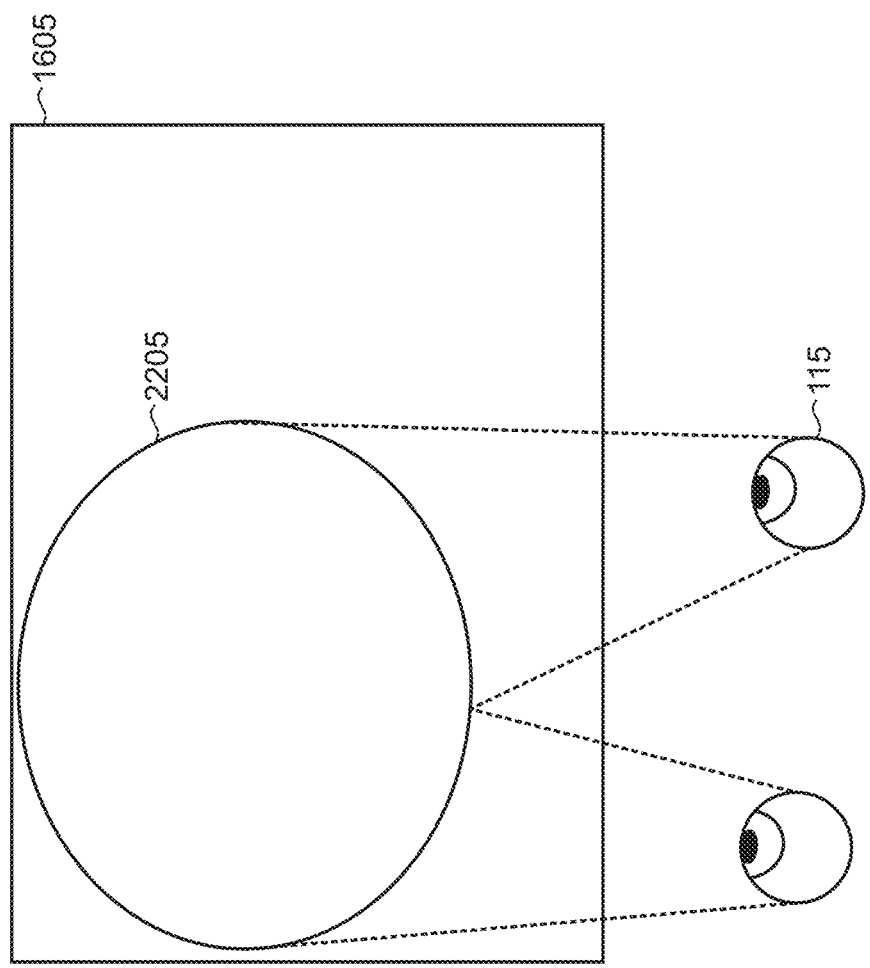
FIG. 22 shows an illustrative correction region for gaze-based weighting.

FIG. 22 shows an illustrative representation of the display FOV 1605 having a gaze-based color-corrected region 2205. As illustratively depicted by the broken lines extending from opposite ends of each eye of the user, the gaze-based color-corrected region 2205 is derived from the size of the user's eye as opposed to the pupil location as in the foveal color-corrected gaze region as discussed above and shown in FIGS. 16-19. In other embodiments the gaze-based color-corrected region may be based on a measurement of the eye's orbit instead of the size of the eye (not shown).

FIG. 23 shows an illustrative diagram in which the gaze-based color-corrected region 2205 has different corrections based on various calculations to accommodate a larger correction over the exit pupil. For example, the gaze-based color-corrected region has multiple internal regions 2305 which are color-corrected to different extents. In this example, the most finely corrected internal region is the center of the color-corrected region 2205, and the extent of color correction reduces as the other internal regions are placed outward from the center. The centrally located internal region may be most color-corrected because that is where the user's eye is generally concentrated. As illustratively shown in the diagram, a mid-level color correction is applied at the middle internal region and relatively low-level color correction is applied to the most outer internal region. Varying the color correction regions can preserve system resources by most finely color correcting the regions at which the user typically concentrates and reducing color correction resources on areas at which the user less-typically concentrates.

Gaze-based weighting color correction can also implement variable gaze sizes 2310, as representatively shown in FIG. 23. For example, the size of the internal regions are dynamic and may vary for different uses and for different users. The sizes 2310 may depend on a current measurement of the size of the eye or the orbit (FIG. 20), and eye slew rate relative to the device, among other dependencies. For example, higher eye slew rate relative to the device may indicate an increase in the centrally located color-corrected region so that more parts of the display are finely optimized to cater to the higher slew rate. Larger sized eyes or orbits may also facilitate an increased centrally located internal region to cater to the greater surface area observed by the user. The color correction region 2205 may also increase or decrease based on the size of the user's eye or orbit.

FIG. 24 shows an illustrative diagram in which the HMD device operating the present color correction features can switch modes 2405 between gaze-based weighting, foveated color correction, or operating both modes simultaneously. The device can switch modes responsive to user input 2410 or dynamically 2415. The user input may be done via a user interface on the display including any one of voice, touch, gesture, or other input mechanism offered by the respective device.

The dynamic mode switching may be done automatically by the device based on a measured power state 2420 or pupil movement 2425 of the user. For example, foveal color correction may expend greater resources to operate relative to gaze-based weighting. When the device's available battery life falls below a threshold level the device may automatically switch to gaze-based weighting, at least until the device is in a charging state or has charged to a point above the threshold.

If the pupil movement relative to the device extends above a threshold rate then the device may switch to the gaze-based weighting. The foveal color correction may not provide a satisfactory user experience if the eye monitoring sensors cannot keep up with the user's pupil location and/or the color correction mask cannot be applied quickly enough to keep up with the user's fast-paced pupil movement. Switching to the gaze-based weighting mode can increase the surface area at which the color correction mask is applied since it corrects a larger FOV relative to the foveated color correction gaze region. That is, the gaze-based weighting is based on a measurement of the user's eye or orbit which thereby provides a greater corrected FOV relative to pupil utilization.

FIG. 25 shows an illustrative diagram in which the HMD device can simultaneously perform dual operation 2505 of the gaze-based weighting and foveated color correction. In such an implementation the gaze-based weighting color correction mask may be applied to the FOV while the HMD device continues to monitor and color correct specific locations on the FOV for the user's pupil. For example, if the user gazes at a lesser corrected portion of the color correction region (e.g., the low-level correction region of FIG. 23), the foveal color correction mode may correct the specific gaze position to a greater extent. The two modes complement each other and are configured to take into account the other mode's applied correction.

Figure 26:
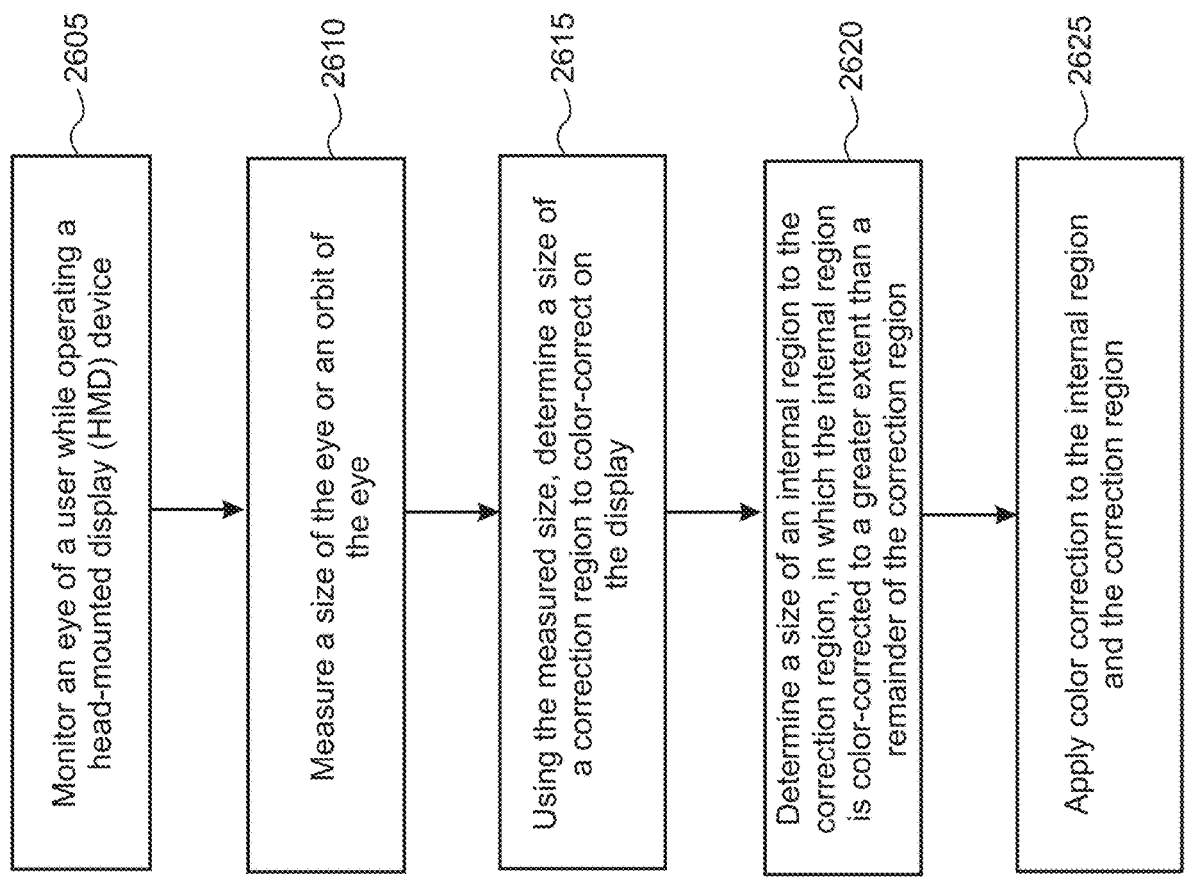
FIGS. 26-28 show illustrative processes performed by the HMD device.

FIG. 26 is a flowchart of an illustrative method 2600 in which an HMD device applies color correction to a foveal gaze region on a display. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2605, an eye of a user is monitored while the user is operating an HMD device. In step 2610, a size of the eye or an orbit of the eye is measured. In step 2615, using the measured size, a size of a correction region is determined, in which the correction region is the region which is color-corrected on the display of the HMD device. In step 2620, a size of an internal region to the correction region is determined, in which the internal region is color-corrected to a greater extent than a remainder of the correction region. In step 2625, color correction is applied to the internal region and the correction region.

Figure 27:
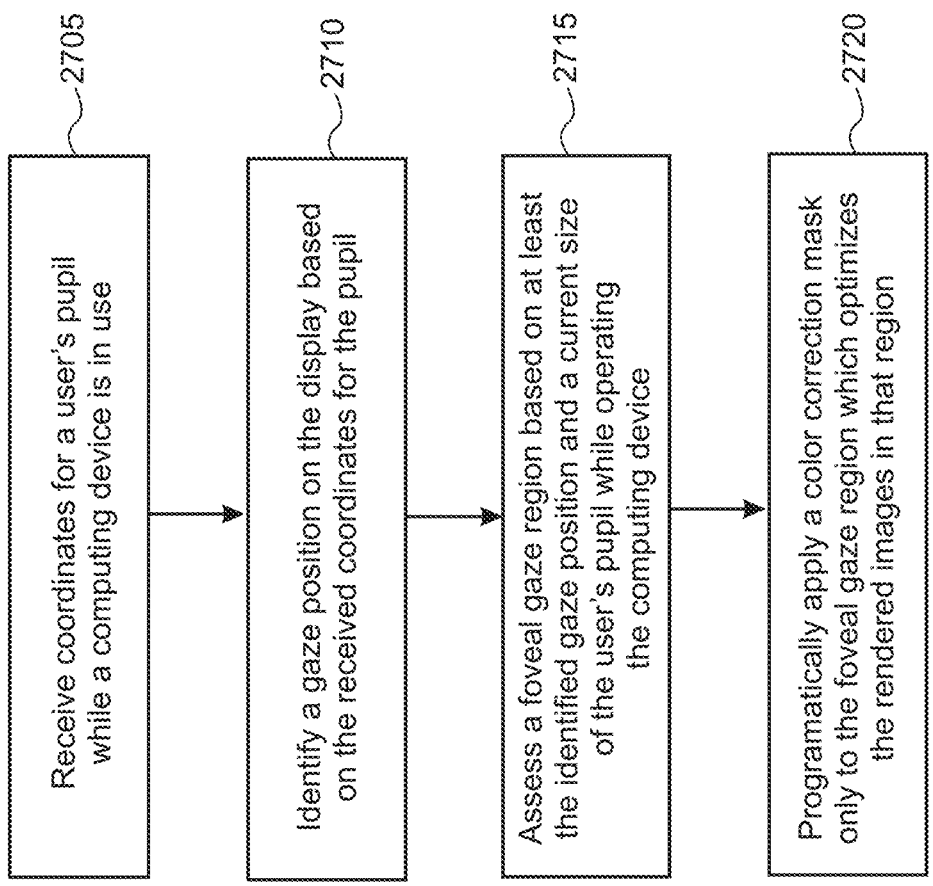

FIG. 27 is a flowchart of an illustrative method 2700 in which a computing device programmatically applies a color correction mask to a foveal gaze region. In step 2705, coordinates are received for a user's pupil while the computing device is in use. In step 2710, a gaze position on the display is identified based on the received coordinates for the pupil. In step 2715, a foveal gaze region is assessed based on at least the identified gaze position and a current size of the user's pupil while operating the computing device. In step 2720, a color correction mask is programmatically applied only to the foveal gaze region, in which the color correction mask optimizes the rendered images in that region.

Figure 28:
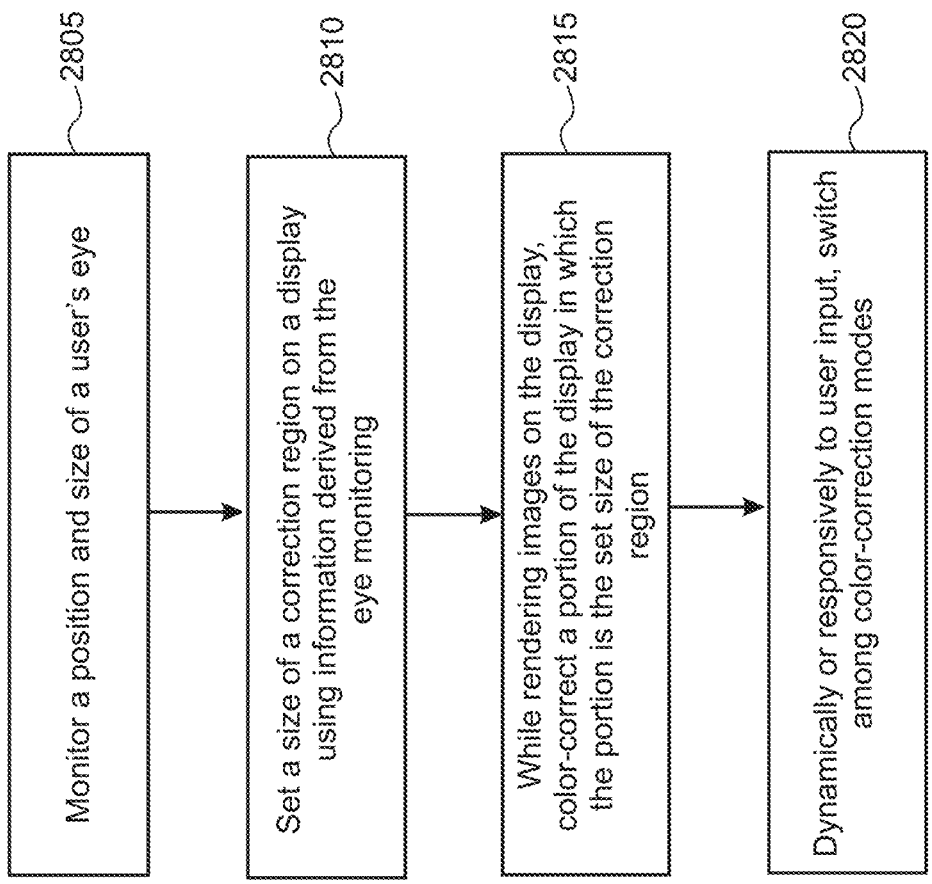

FIG. 28 is a flowchart of an illustrative method 2800 in which an HMD device switches among color correction modes for a display. In step 2805, a position and size of a user's eye is monitored. In step 2810, a size of a correction region on the display is set using information derived from the eye monitoring. In step 2815, while rendering images on the display, color correct a portion of the display in which the portion is the set size of the correction region. In step 2820, dynamically or responsively to user input, switch among color correction modes which include color correcting the set size based on the user's pupil, the user's full eye or orbit, or the pupil and the full eye or orbit simultaneously.

FIG. 29 shows one particular illustrative example of a see-through, mixed reality or virtual reality HMD device 2900, and FIG. 30 shows a functional block diagram of the device 2900. HMD device 2900 comprises one or more lenses 2902 that form a part of a see-through display subsystem 2904, so that images may be displayed using lenses 2902 (e.g. using projection onto lenses 2902, one or more waveguide systems, such as a near-eye display system, incorporated into the lenses 2902, and/or in any other suitable manner). HMD device 2900 further comprises one or more outward-facing image sensors 2906 configured to acquire images of a background scene and/or physical environment being viewed by a user, and may include one or more microphones 2908 configured to detect sounds, such as voice commands from a user. Outward-facing image sensors 2906 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 2900 may further include a gaze detection subsystem 2910 configured for detecting a direction of gaze of each eye of a user or a direction or location of focus, as described above. Gaze detection subsystem 2910 may be configured to determine gaze directions of each of a user's eyes in any suitable manner. For example, in the illustrative example shown, a gaze detection subsystem 2910 includes one or more glint sources 2912, such as infrared light sources, that are configured to cause a glint of light to reflect from each eyeball of a user, and one or more image sensors 2914, such as inward-facing sensors, that are configured to capture an image of each eyeball of the user. Changes in the glints from the user's eyeballs and/or a location of a user's pupil, as determined from image data gathered using the image sensor(s) 2914, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2910 may have any suitable number and arrangement of light sources and image sensors.

The HMD device 2900 may also include additional sensors. For example, HMD device 2900 may comprise a global positioning system (GPS) subsystem 2916 to allow a location of the HMD device 2900 to be determined. This may help to identify real-world objects, such as buildings, etc. that may be located in the user's adjoining physical environment.

The HMD device 2900 may further include one or more motion sensors 2918 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 2906. The use of motion data may allow changes in gaze location to be tracked even if image data from outward-facing image sensor(s) 2906 cannot be resolved. The motion sensors may also be utilized to determine the extensiveness of the user's head movement which can be utilized by the HMD device in expanding or contracting the foveal color-corrected gaze region.

In addition, motion sensors 2918, as well as microphone(s) 2908 and gaze detection subsystem 2910, also may be employed as user input devices, such that a user may interact with the HMD device 2900 via gestures of the eye, neck and/or head, as well as via verbal commands in some cases. It may be understood that sensors illustrated in FIGS. 29 and 30 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2900 can further include a controller 2920 such as one or more processors having a logic subsystem 2922 and a data storage subsystem 2924 in communication with the sensors, gaze detection subsystem 2910, display subsystem 2904, and/or other components through a communications subsystem 2926. The communications subsystem 2926 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2924 may include instructions stored thereon that are executable by logic subsystem 2922, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2900 is configured with one or more audio transducers 2928 (e.g., speakers, earphones, etc.) so that audio can be utilized as part of a mixed reality or virtual reality experience. A power management subsystem 2930 may include one or more batteries 2932 and/or protection circuit modules (PCMs) and an associated charger interface 2934 and/or remote power interface for supplying power to components in the HMD device 2900.

It may be appreciated that the HMD device 2900 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 31:
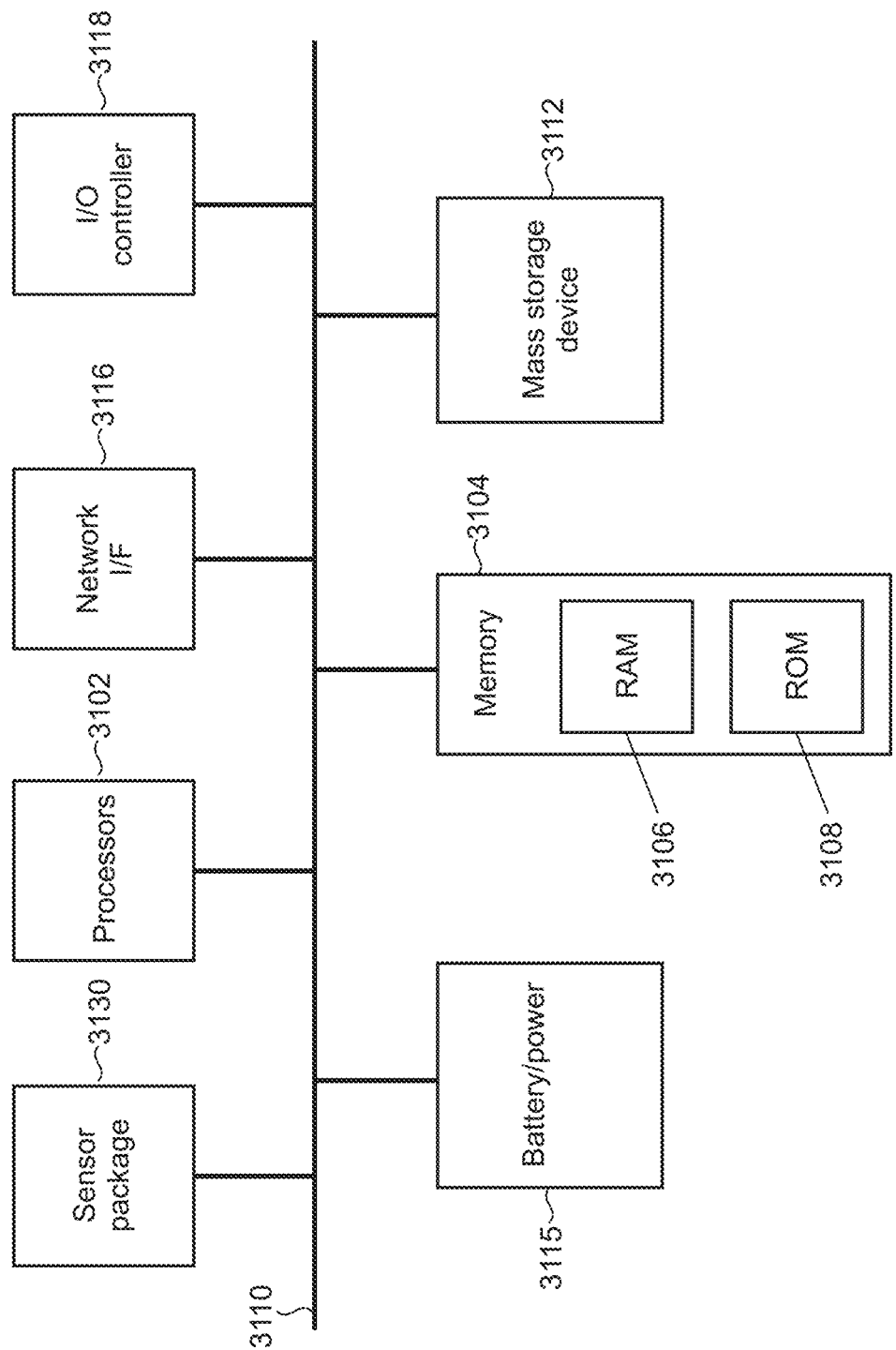
FIG. 31 is a simplified block diagram of an illustrative computing device that may be used to implement the present foveated color correction to improve color uniformity of head-mounted displays.

FIG. 31 shows an illustrative architecture 3100 for a computing device capable of executing the various components described herein for providing foveated color correction to improve color uniformity of head-mounted displays. Thus, the architecture 3100 illustrated in FIG. 31 shows a system architecture that may be adapted for various computing devices, such as smartphones, tablet computers, laptops, personal computers, and the like. For example, a user may hold a smartphone to his face in which the smartphone can provide the virtual or mixed reality experience. The front facing camera (i.e., facing toward the user) can detect the user's eye position and the rear facing camera (i.e., facing away from the user) can be used to capture real world images.

The architecture 3100 illustrated in FIG. 31 includes one or more processors 3102 (e.g., central processing unit, graphic processing units, etc.), a system memory 3104, including RAM (random access memory) 3106 and ROM (read only memory) 3108, and a system bus 3110 that operatively and functionally couples the components in the architecture 3100. A basic input/output system containing the basic routines that help to transfer information between elements within the architecture 3100, such as during startup, is typically stored in the ROM 3108. The architecture 3100 further includes a mass storage device 3112 for storing software code or other computer-executed code that is utilized to implement applications, the file system, and the operating system. The mass storage device 3112 is connected to the processor 3102 through a mass storage controller (not shown) connected to the bus 3110. The mass storage device 3112 and its associated computer-readable storage media provide non-volatile storage for the architecture 3100. Although the description of computer-readable storage media contained herein refers to a mass storage device, such as a hard disk or CD-ROM drive, it may be appreciated by those skilled in the art that computer-readable storage media can be any available storage media that can be accessed by the architecture 3100.

The architecture 3100 further supports a sensor package 3130 comprising one or more sensors or components that are configured to detect parameters that are descriptive of the environment. For example, sensors can include a gyroscope to determine the device's orientation, such as when the user holds the smartphone to his face. A camera may also be utilized to identify characteristics of the pupil such as pupil positioning and size. The sensors may be configured to run continuously, or periodically. The architecture further supports power and/or battery components (collectively identified by reference numeral 3115). For example, one or more batteries or power packs may be rechargeable or replaceable to facilitate portability, mobility, and re-use.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3100.

According to various embodiments, the architecture 3100 may operate in a networked environment using logical connections to remote computers through a network. The architecture 3100 may connect to the network through a network interface unit 3116 connected to the bus 3110. It may be appreciated that the network interface unit 3116 also may be utilized to connect to other types of networks and remote computer systems. The architecture 3100 also may include an input/output controller 3118 for receiving and processing input from a number of other devices, including a keyboard, mouse, touchpad, touchscreen, control devices such as buttons and switches or electronic stylus (not shown in FIG. 31). Similarly, the input/output controller 3118 may provide output to a display screen, user interface, a printer, or other type of output device (also not shown in FIG. 31).

The architecture 3100 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 3100 may include a gesture recognition unit (not shown) to facilitate user interaction with a device supporting the architecture through sensed gestures, movements, and/or other sensed inputs.

It may be appreciated that the software components described herein may, when loaded into the processor 3102 and executed, transform the processor 3102 and the overall architecture 3100 from a general-purpose computing system into a special-purpose computing system customized to facilitate the functionality presented herein. The processor 3102 may be constructed from any number of transistors or other discrete circuit elements, which may individually or collectively assume any number of states. More specifically, the processor 3102 may operate as a finite-state machine, in response to executable instructions contained within the software modules disclosed herein. These computer-executable instructions may transform the processor 3102 by specifying how the processor 3102 transitions between states, thereby transforming the transistors or other discrete hardware elements constituting the processor 3102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3100 in order to store and execute the software components presented herein. It also may be appreciated that the architecture 3100 may include various types of computing devices, including wearable devices, handheld computers, embedded computer systems, PDAs, and other types of computing devices known to those skilled in the art. It is also contemplated that the architecture 3100 may not include all of the components shown in FIG. 31, may include other components that are not explicitly shown in FIG. 31, or may utilize an architecture completely different from that shown in FIG. 31.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method to correct a display of a head-mounted display (HMD) device that is adapted to render virtual images, comprising:

monitoring an eye of a user while operating the HMD device, in which the HMD device comprises a near-eye waveguide-based display comprising a waveguide, at least one diffractive optical element for in-coupling light for the virtual images into the waveguide, and at least one diffractive optical element for out-coupling the virtual image light from the waveguide to the user's pupil, in which the diffractive optical elements and the waveguide inherently provide for color non-uniformities in virtual images rendered on the near-eye waveguide-based display;

measuring a size of the eye or an orbit of the eye;

using the measured size, determining a size of a correction region to color correct on the near-eye waveguide-based display;

determining a size of an internal region in the correction region, in which the internal region is color-corrected to a greater level relative to a remainder of the correction region; and applying respective levels of color correction to the internal region and the correction region to correct for color non-uniformities in the internal region and the correction region of the near-eye waveguide-based display.

2. The method of claim 1, in which a size for more than one internal region is determined.

3. The method of claim 2, in which each internal region is color-corrected differently.

4. The method of claim 3, in which a centrally located internal region relative to the correction region is more finely color-corrected than internal regions relatively farther from a center of the correction region.

5. The method of claim 1, in which the size of the eye or the orbit of the eye is measured in radius or distance from one end to an opposite end.

6. One or more hardware-based non-transitory computer-readable memory devices storing instructions which, when executed by one or more processors disposed in a computing device, cause the computing device to:
receive coordinates for a user's pupil while the computing device is in use, in which the computing device includes a near-eye waveguide-based display configured for rendering virtual images, the near-eye waveguide-based display comprising a waveguide, at least one diffractive optical element for in-coupling light for the virtual images into the waveguide, and at least one diffractive optical element for out-coupling the virtual image light from the waveguide to the user's pupil, the diffractive optical elements and the waveguide inherently providing for color non-uniformities in the rendered virtual images;
identify a gaze position on the near-eye waveguide-based display based on the received coordinates for the pupil;
assess a foveal gaze region based on at least one of the gaze position or a current size of the user's pupil while operating the computing device, the foveal gaze region being within an inner boundary of the user's peripheral view; and
programmatically apply a color correction mask only to the foveal gaze region in which the applied mask corrects for the color non-uniformities in the virtual images rendered in the foveal gaze region of the near-eye waveguide-based display.

7. The one or more hardware-based non-transitory computer-readable memory devices of claim 6, in which the coordinates are derived from a sensor which tracks the user's eye movement and pupil, and the coordinates are received at a processor within the computing device.

8. The one or more hardware-based non-transitory computer-readable memory devices of claim 6, in which a separate color correction mask is applied within a periphery region outside of the foveal gaze region, and the rendered virtual images within the periphery region are optimized to a lesser extent relative to the color correction mask applied to the foveal gaze region.

9. The one or more hardware-based non-transitory computer-readable memory devices of claim 6, in which a size of the foveal gaze region contracts and expands based on measurements for factors associated with the computing device and the user, the measurements being taken periodically while the computing device is in use.

10. The one or more hardware-based non-transitory computer-readable memory devices of claim 9, in which the factors that cause the size of the foveal gaze region to contract include one or more of latency in applying the color correction mask surpassing a threshold, a reduction in pupil size, a reduction in system resources, or displayed content.

11. The one or more hardware-based non-transitory computer-readable memory devices of claim 9, in which the factors that cause the size of the foveal gaze region to expand include one or more of eye slew rate surpassing a threshold rate, an expansion in pupil size, an increased availability of system resources, and displayed content.

12. The one or more hardware-based non-transitory computer-readable memory devices of claim 6, in which various operations in the computing device are performed in real time to facilitate the real-time application of the color correction mask to the foveal gaze region, the real time operations including periodically tracking pupil location, pupil size, displayed content recognition, and latency determination.

13. A head-mounted display (HMD) device configured to reduce or eliminate color non-uniformities on a display that is adapted to render virtual images and reduce resource consumption, comprising:
a waveguide-based display comprising a waveguide, at least one diffractive optical element for in-coupling light for the virtual images into the waveguide, and at least one diffractive optical element for out-coupling the virtual image light from the waveguide to the user's pupil, the diffractive optical elements and the waveguide inherently providing for color non-uniformities in virtual images rendered on the waveguide-based display;
one or more processors; and
one or more hardware-based non-transitory memory devices storing computer-readable instructions which, when executed by the one or more processors, cause the HMD device to:
monitor a position and size of a user's eye;
set a size of a correction region on the waveguide-based display using information derived from the eye monitoring;
while rendering images on the waveguide-based display, color correct a portion of the waveguide-based display in which the portion is the set size of the correction region, and wherein the color-corrected portion is tailored to at least one of a full eye, an orbit of the eye, or a pupil of the eye; and
dynamically or responsively to user input, switch among color correction modes which include color correcting the set size based on the user's pupil, the user's full eye or orbit, or the pupil and the full eye or orbit simultaneously.

14. The HMD device of claim 13, in which dynamically switching between the color correction modes is responsive to a measured power state or pupil movement.

15. The HMD device of claim 14, in which:
when the pupil movement exceeds a threshold movement rate, switching from pupil color correction to full eye or orbit color correction; and
when the power state reaches a threshold power level, switching from pupil color correction to full eye or orbit color correction.

16. The HMD device of claim 15, in which the measured pupil movement is relative to the HMD device.

17. The HMD device of claim 13, in which when the pupil of the eye is color-corrected, the monitoring measures a pupil size and pupil movement.

18. The HMD device of claim 13, in which when the full eye or orbit of the eye is color-corrected, the monitoring measures a size and position of the full eye or the orbit of the eye.

19. The HMD device of claim 18, in which the one or more processors further cause the HMD device to measure a size of the user's full eye or orbit using diameter or radius.

20. The HMD device of claim 13, further including an adjustable sensor used to monitor and measure the user's eye, in which:
- the adjustable sensor is positioned relatively nearer to the user's eye when measuring the pupil's size and position; and
- the adjustable sensor is positioned relatively farther from the user's eye when measuring the full eye or orbit's size and position.

* * * * *